United States Patent
Yoshioka et al.

(10) Patent No.: US 7,398,148 B2
(45) Date of Patent: Jul. 8, 2008

(54) CONTROL DEVICE FOR INTERNAL COMBUSTION ENGINE

(75) Inventors: Mamoru Yoshioka, Susono (JP); Yasuyuki Takama, Gotemba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 149 days.

(21) Appl. No.: 10/582,094

(22) PCT Filed: Sep. 9, 2005

(86) PCT No.: PCT/JP2005/017086

§ 371 (c)(1),
(2), (4) Date: Jun. 8, 2006

(87) PCT Pub. No.: WO2006/030876

PCT Pub. Date: May 23, 2006

(65) Prior Publication Data
US 2007/0250250 A1    Oct. 25, 2007

(30) Foreign Application Priority Data
Sep. 14, 2004  (JP)  ............................ 2004-266344
Feb. 16, 2005  (JP)  ............................ 2005-039663

(51) Int. Cl.
*F02M 25/07*  (2006.01)
*F02B 47/08*  (2006.01)
*G06F 17/00*  (2006.01)

(52) U.S. Cl. .................. 701/103; 701/108; 701/110; 123/568.21

(58) Field of Classification Search ............ 123/568.11, 123/568.14, 568.21; 701/101–105, 108, 701/110, 111, 115; 60/378, 605.2
See application file for complete search history.

(56) References Cited

U.S. PATENT DOCUMENTS

| | | | | | |
|---|---|---|---|---|---|
| 4,002,154 | A | * | 1/1977 | Kestner | .................. 123/568.32 |
| 5,345,817 | A | * | 9/1994 | Grenn et al. | ................. 701/110 |
| 5,524,591 | A | * | 6/1996 | Hirota et al. | ........... 123/568.21 |
| 7,021,050 | B2 | * | 4/2006 | Nishimura et al. | ..... 123/568.11 |
| 7,275,525 | B2 | * | 10/2007 | Miyasako et al. | ........... 701/108 |
| 2001/0013221 | A1 | | 8/2001 | Suzuki et al. | |

FOREIGN PATENT DOCUMENTS

| | | | |
|---|---|---|---|
| EP | 1 004 760 A2 | 5/2000 | |
| JP | 62070652 A | * 4/1987 | ................. 701/108 |
| JP | Y2 A 6-12234 | 3/1994 | |

(Continued)

*Primary Examiner*—Willis R. Wolfe, Jr.
(74) *Attorney, Agent, or Firm*—Oliff & Berridge, PLC

(57) ABSTRACT

The valve timing is changed to increase the internal EGR amount the moment a fuel cut process begins (FIG. 2C). Before a sufficient amount of internal EGR is obtained, control is exercised so that the throttle-opening angle TA is larger than a basic idle-opening angle TA0. When a sufficient amount of internal EGR is obtained, control is exercised so that the throttle-opening angle TA is smaller than the basic idle-opening angle TA0 (FIG. 2D). The increase in the internal EGR amount is rendered smaller during fuel cut at a low rotation speed than during fuel cut at a high rotation speed. In addition, the amount of decrease in the throttle-opening angle TA is rendered smaller during fuel cut at a low rotation speed than during fuel cut at a high rotation speed.

20 Claims, 23 Drawing Sheets

FOREIGN PATENT DOCUMENTS

| | | |
|---|---|---|
| JP | A 10-115234 | 5/1998 |
| JP | A 10-259747 | 9/1998 |
| JP | A 10-299518 | 11/1998 |
| JP | A 2000-220462 | 8/2000 |
| JP | A 2001-227383 | 8/2001 |
| JP | A 2002-227671 | 8/2002 |
| JP | A 2002-322931 | 11/2002 |
| JP | A 2003-97308 | 4/2003 |
| JP | 2004011492 A * 1/2004 | ................ 701/110 |
| JP | A 2004-52677 | 2/2004 |

* cited by examiner

⟨TARGET VVT1 VALUE (vt1) BASED ON NE*KI EXCEPT FOR DECELERATION FUEL CUT-OFF⟩

| kl \ NE | 800 | 1200 | 1600 | — | — | 6000 | 6400 |
|---|---|---|---|---|---|---|---|
| 10 | 0 | 0 | 0 | — | — | 0 | 0 |
| 20 | 3 | 5 | 5 | — | — | 2 | 0 |
| 30 | 8 | 10 | 14 | — | — | 2 | 0 |
| — | — | — | — | — | — | — | — |
| 90 | 15 | 25 | 30 | — | — | 2 | 0 |
| 100 | 15 | 25 | 30 | — | — | 2 | 0 |

⟨TARGET VVT2 VALUE (vt2) BASED ON NE DURING DECELERATION FUEL CUT-OFF⟩

| NE | 800 | — | 1600 | 2800 | 4000 | 5200 | 6400 |
|---|---|---|---|---|---|---|---|
| vtt | 0 | — | 0 | 25 | 30 | 30 | 30 |

Fig. 7

⟨TARGET THROTTLE OPENING VALUE (kfcta1) BASED ON NE PREVAILING WHEN DECELERATION FUEL CUT-OFF IS BEING PERFORMED AND VVT ADVANCE ANGLE IS SMALL⟩

| NE | 800 | — | 1600 | 2800 | 4000 | 5200 | 6400 |
|---|---|---|---|---|---|---|---|
| ta | 0 | — | 0 | 4 | 5 | 6 | 7 |

Fig. 8

⟨TARGET THROTTLE VALVE CLOSING VALUE (kfcta2) BASED ON NE PREVAILING WHEN DECELERATION FUEL CUT-OFF IS BEING PERFORMED AND VVT ADVANCE ANGLE IS LARGE⟩

| NE | 800 | — | 1600 | 2800 | 4000 | 4800 | 6400 |
|---|---|---|---|---|---|---|---|
| ta | 0 | — | 0 | 4 OR MORE | 5 OR MORE | 6 OR MORE | 7 OR MORE |

Fig. 9A
FUEL CUT-OFF
CONDITION
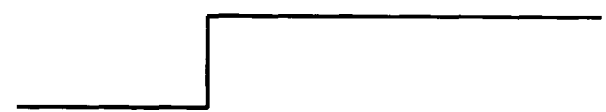
Fig. 9B
VIRTUAL Vtt
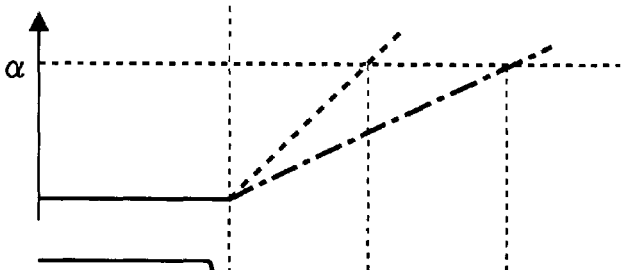
Fig. 9C
VIRTUAL TA
Fig. 9D
FUEL CUT-OFF
RULES
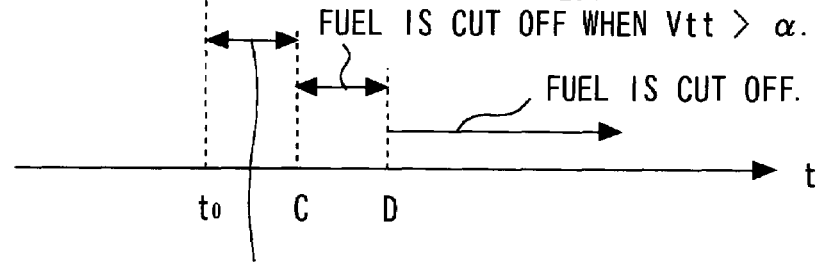
FUEL CUT-OFF FUNCTION DISABLED.

Fig. 13A
F/C
Fig. 13B
OSA$_{SC}$
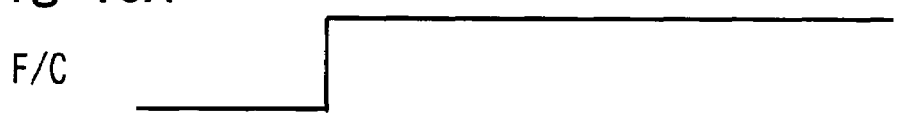
Fig. 13C
OSA$_{UF}$
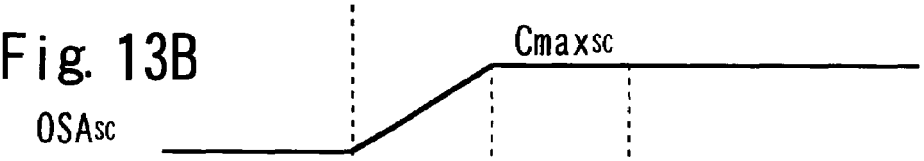
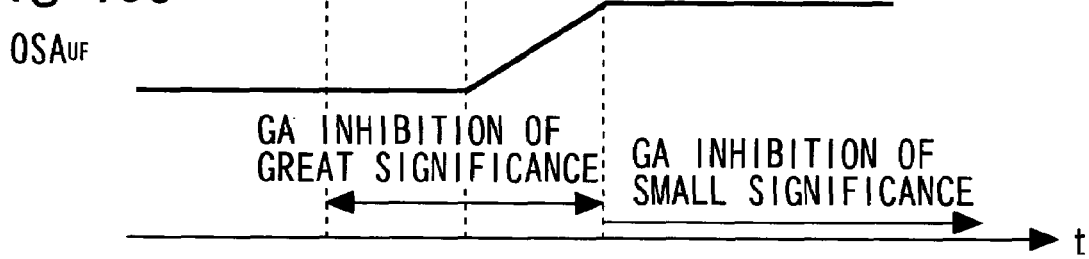

F/C

OSAsc

OSAuf

TA

⟨TARGET THROTTLE VALVE OPENING VALUE (kfcta3) BASED ON NE AFTER DECELERATION FUEL CUT-OFF AND JUDGMENT OF EXCESSIVE CATALYST OXYGEN⟩

| NE | 800 | — | 1600 | 2800 | 4000 | 5200 | 6400 |
|----|-----|---|------|------|------|------|------|
| ta | 0   | — | 0    | 8    | 10   | 12   | 14   |

CONTROL DEVICE FOR INTERNAL COMBUSTION ENGINE

TECHNICAL FIELD

The present invention relates to a control device for an internal combustion engine, and more particularly to a control device suitable for controlling an internal combustion engine that is equipped with a mechanism for adjusting the exhaust gas recirculation amount and a mechanism for adjusting the intake air amount.

BACKGROUND ART

A conventional technology disclosed, for instance, by Japanese laid-open patent No. 2002-22671 optimizes the internal combustion engine's valve timing and valve lift amount in order to prevent the oil consumption amount from increasing (oil rising) at the time of internal combustion engine deceleration and inhibit the catalyst from deteriorating at the time of internal combustion engine deceleration.

When the throttle is closed, that is, when the driver makes a request for deceleration, the fuel is generally cut off in the internal combustion engine to improve the fuel consumption characteristic. Therefore, when the internal combustion engine decelerates, a considerable negative pressure is produced in the intake pipe, and air containing no fuel is distributed from the intake path to the exhaust path.

When a considerable negative pressure is produced within the intake pipe, it is likely that the in-cylinder pressure in the internal combustion engine will be rendered negative. If the in-cylinder pressure is rendered negative, the so-called oil rising occurs to increase the amount of oil consumption in the internal combustion engine. From the viewpoint of oil consumption amount minimization, therefore, it is preferred that the intake pipe pressure prevailing at the time of internal combustion engine deceleration be not rendered unduly negative. To this end, therefore, the intake air amount is increased with an increase in the engine speed at the time of deceleration.

Meanwhile, the catalyst positioned in the exhaust path of the internal combustion engine is likely to deteriorate when being supplied with a lean gas in a high-temperature environment. Therefore, it is preferred that the air distribution amount be reduced during internal combustion engine deceleration in order to inhibit catalyst deterioration during a fuel cut period.

The conventional system described above optimizes the valve timing and valve lift amount to reduce the air distribution amount at the time of internal combustion engine deceleration without making the intake pipe pressure unduly negative. The system, therefore, excels in minimizing the oil consumption amount increase due to deceleration fuel cut and inhibiting catalyst deterioration.

The applicant of the present invention is aware that the following patent documents including the above-mentioned patent document relate to the present invention:

[Patent Document 1]
Japanese laid-open patent No. 2002-227671
[Patent Document 2]
Japanese laid-open patent No. 1998-299518
[Patent Document 3]
Japanese laid-open patent No. 1998-115234
[Patent Document 4]
Japanese laid-open patent No. 2004-52677

However, the conventional system described above merely adjusts the valve characteristic, that is, merely adjusts the characteristic of a single actuator, to prevent the intake pressure from becoming unduly negative and reduce the air distribution amount although preventing the intake pressure from becoming unduly negative is contradictory to reducing the air distribution amount. In this respect, the above conventional system still needs improvement in oil consumption amount minimization and catalyst deterioration prevention.

DISCLOSURE OF INVENTION

The present invention has been made to solve the above problem. It is an object of the present invention to provide an internal combustion engine control device that is capable of substantially inhibiting the oil consumption amount increase and catalyst deterioration due to deceleration fuel cut without impairing the stable operation characteristic of the internal combustion engine.

First aspect of the present invention is a control device for an internal combustion engine, the control device comprising:

fuel cut means for cutting off fuel when the internal combustion engine decelerates;

EGR control means for providing a larger exhaust gas recirculation amount during fuel cut at a high engine speed than during fuel cut at a low engine speed; and intake air amount control means for providing a smaller intake air amount during fuel cut at a high engine speed than during fuel cut at a low engine speed.

Second aspect of the present invention is the control device according to the first aspect, further comprising:

actual EGR judgment means for judging whether an actual value of the exhaust gas recirculation amount is greater than a judgment value, wherein the intake air amount control means includes control delay means, which waits until the actual value of the exhaust gas recirculation amount exceeds the judgment value after the start of fuel cut at a high engine speed, before beginning to exercise control so as to reduce the intake air amount.

Third aspect of the present invention is the control device according to the second aspect, further comprising:

a variable valve mechanism that can vary a valve overlap period during which an intake valve open period overlaps with an exhaust valve open period, wherein the EGR control means includes VVT control means, which drives the variable valve mechanism to adjust an internal exhaust gas recirculation amount; and wherein the actual EGR judgment means determines according to the status of the variable valve mechanism whether the actual value of the exhaust gas recirculation amount is greater than the judgment value.

Fourth aspect of the present invention is the control device according to the second or the third aspect, wherein the intake air amount control means includes means that maintains a larger intake air amount than at the beginning of fuel cut during the time interval between the instant at which fuel cut begins at a high engine speed and the instant at which the actual value of the exhaust gas recirculation amount exceeds the judgment value.

Fifth aspect of the present invention is the control device according to any one of the first to fourth aspects, further comprising:

actual EGR judgment means for judging whether the actual value of the exhaust gas recirculation amount is greater than the judgment value; and fuel cut function disable means for disabling a fuel cut function during the time interval between the instant at which a fuel cut execution condition is established and the instant at which the actual value of the exhaust gas recirculation amount exceeds the judgment value.

Sixth aspect of the present invention is the control device according to the fifth aspect, further comprising:

fuel cut function enable means for enabling the fuel cut function when a fuel cut function disable limit period elapses after fuel cut execution condition establishment.

Seventh aspect of the present invention is the control device according to any one of claims 1 to 6, further comprising:

throttle opening angle electronic control means for electronically controlling a throttle opening angle in accordance with an accelerator opening angle, wherein the fuel cut means determines according to the accelerator opening angle whether the fuel cut execution condition is established.

Eighth aspect of the present invention is the control device according to any one of the first to seventh aspects, further comprising:

increased EGR amount canceling means, which, when fuel cut has continued for a predetermined period of time, cancels the increased amount for correction purposes of the exhaust gas recirculation provided by the EGR control means; and decreased amount canceling means, which, when fuel cut has continued for the predetermined period of time, cancels the decreased amount for correction purposes of the intake air provided by the intake air amount control means.

Ninth aspect of the present invention is the control device according to the eighth aspect, further comprising:

continuation time judgment means, which, when it is estimated that a catalyst positioned in an exhaust path of the internal combustion engine fully occludes oxygen after the start of fuel cut, judges that fuel cut has continued for the predetermined period of time.

Tenth aspect of the present invention is the control device according to the ninth aspect, wherein the catalyst contains an upstream catalyst and a downstream catalyst, which are serially arranged, and includes a downstream oxygen sensor, which is positioned downstream of the upstream catalyst; and wherein the continuation time judgment means includes air amount cumulating means, which calculates a cumulative intake air amount that is reached since the downstream oxygen sensor begins to generate a lean output after the start of fuel cut, and judgment means, which, when the cumulative intake air amount reaches a value for causing the downstream catalyst to fully occlude oxygen, judges that fuel cut has continued for the predetermined period of time.

Eleventh aspect of the present invention is the control device according to the tenth aspect, further comprising:

upstream oxygen storage capacity detection means for detecting the oxygen storage capacity of the upstream catalyst; and setup means, which sets the value for causing the downstream catalyst to fully occlude oxygen in accordance with the oxygen storage capacity of the upstream catalyst.

Twelfth aspect of the present invention is the control device according to any one of the eighth to eleventh aspects, further comprising:

cooling purpose flow amount achievement means, which, when fuel cut has continued for the predetermined period of time, controls the intake air amount so as to invoke an intake air amount for cooling purposes, which is larger than the amount prevailing before the start of fuel cut; and flow amount change means, which, when the intake air amount for cooling purposes has been maintained for a predetermined cooling period during fuel cut, exercises control so that the intake air amount is larger than the amount prevailing before the start of fuel cut and smaller than the amount for cooling purposes.

Thirteenth aspect of the present invention is the control device according to the eleventh aspect, further comprising:

catalyst temperature detection/estimation means for detecting or estimating the temperature of a catalyst positioned in an exhaust path of the internal combustion engine; and cooling time setup means for setting the cooling period in accordance with the temperature of the catalyst.

Fourteenth aspect of the present invention is the control device according to any one of the first to thirteenth aspects, wherein the EGR control means includes an EGR adjustment mechanism, which operates to change the exhaust gas recirculation amount; operating speed detection means, which detects an operating speed of the EGR adjustment mechanism; and operating amount setup means, which sets an operating amount of the EGR adjustment mechanism for a fuel cut period in accordance with the operating speed.

Fifteenth aspect of the present invention is the control device according to the fourteenth aspect, wherein the intake air amount control means includes reduction amount setup means, which ensures that a reduction amount for the intake air amount for a fuel cut period decreases with an increase in the operating amount.

Sixteenth aspect of the present invention is the control device according to claim 14 or 15, wherein the operating speed detection means detects the operating speed of the EGR adjustment mechanism in a region where an engine speed exceeds a judgment value.

Seventeenth aspect of the present invention is the control device according to claim 16, wherein the operating speed detection means includes operating speed measurement means, which measures the operating speed of the EGR adjustment mechanism at an arbitrary engine speed; rotation speed storage means, which stores the engine speed when the operating speed is measured; and conversion means, which, in accordance with the engine speed prevailing when the operating speed is measured, converts the operating speed measured by the operating speed measurement means to an operating speed within the region where an engine speed exceeds the judgment value.

Eighteenth aspect of the present invention is the control device according to any one of the fourteenth to seventeenth aspects, wherein the EGR adjustment mechanism is driven by a hydraulic pressure exerted by the internal combustion engine; and wherein the operating speed detection means includes operating speed measurement means for measuring the operating speed of the EGR adjustment mechanism at an arbitrary oil temperature, oil temperature storage means for storing an oil temperature prevailing when the operating speed is measured; oil temperature detection means for detecting an oil temperature at a predefined time; and conversion means for converting the operating speed measured by the operating speed measurement means to an operating speed at the predefined time in accordance with the oil temperature prevailing when the operating speed is measured and the oil temperature prevailing at the predefined time.

Nineteenth aspect of the present invention is the control device according to the eleventh aspect, wherein the cooling purpose flow amount achievement means and the flow amount change means control the intake air amount by controlling a throttle opening angle or an idle speed control (ISC) valve flow rate.

Twentieth aspect of the present invention is the control device according to any one of the first to nineteenth aspects, wherein the intake air amount control means controls the intake air amount by controlling the throttle opening angle or the idle speed control (ISC) valve flow rate.

According to the first aspect of the present invention, it is possible to recirculate a large amount of exhaust gas and reduce the intake air amount when the fuel is cut off while the engine rotates at a high speed. If a large amount of exhaust gas recirculates, it is possible to prevent the intake pressure from becoming unduly negative even when the fuel is cut off during high-speed engine rotation. In this instance, it is also possible to prevent the gas flow to the catalyst from becoming excessively rich while the fuel is cut off. Therefore, when the fuel is cut off during high-speed engine rotation, the present invention makes it possible to substantially inhibit the catalyst from deteriorating while substantially inhibiting the oil rising. Further, the present invention reduces the exhaust gas recirculation amount and suppresses the intake air amount reduction during low-speed engine rotation, which tends to render the internal combustion engine operation unstable unlike during high-speed engine rotation. Therefore, the present invention makes it possible to prevent the internal combustion engine operation from becoming unstable when recovery is achieved from a fuel cut period during low-speed engine rotation.

According to the second aspect of the present invention, when a fuel cut period begins during high-speed engine rotation and the instruction for increasing the exhaust gas recirculation amount is issued, the intake air amount is not reduced until the recirculation amount actually exceeds the judgment value. If the intake air amount is reduced before the exhaust gas recirculation amount is actually provided, the intake pipe pressure temporarily becomes unduly negative so that an oil rising is likely to occur. The present invention makes it possible to avoid the above situation and properly prevent the oil consumption amount from increasing.

The third aspect of the present invention can adjust the exhaust gas recirculation amount (internal EGR amount) by controlling the variable valve mechanism and changing the valve overlap period. In this instance, the actual internal EGR amount is determined according to the status of the variable valve mechanism. Thus, the present invention can accurately judge according to the status of the variable valve mechanism whether the judgment value is exceeded by the exhaust gas recirculation amount.

The fourth aspect of the present invention can maintain a large intake air amount during the time interval between the instant at which a fuel cut operation begins during high-speed engine rotation and the instant at which an adequate amount of exhaust gas recirculation is obtained. Thus, the present invention can properly prevent the intake pipe pressure from becoming unduly negative immediately after the start of a fuel cut operation.

The fifth aspect of the present invention can disable the fuel cut function during the time interval between the instant at which the fuel cut condition is established and the instant at which an adequate amount of exhaust gas recirculation is actually obtained. Thus, the present invention can prevent a large amount of lean gas from flowing to the catalyst immediately after the start of a fuel cut operation, thereby effectively inhibiting the progress of catalyst deterioration.

According to the sixth aspect of the present invention, when the fuel cut function disable limit period elapses after the fuel cut condition is established, a fuel cut operation is stated even if an adequate amount of exhaust gas recirculation is not obtained. Thus, the present invention can properly cause the driver to feel that deceleration is taking place as expected.

The seventh aspect of the present invention can judge according to the accelerator-opening angle, and not according to the throttle-opening angle, whether the fuel cut condition is established. Therefore, the prevent invention can remain unaffected by the time required for the accelerator-opening angle to be reflected in the throttle-opening angle, and promptly judge whether the fuel cut condition is established.

The eighth aspect of the present invention can stop increasing the exhaust gas recirculation amount for correction purposes and stop decreasing the intake air amount for correction purposes when a fuel cut operation is continuously performed for a predetermined period of time. When the fuel cut operation is continuously performed for a long period of time, the catalyst is internally saturated with oxygen so that the reason for inhibiting the lean gas flow to the catalyst disappears. In this situation, the exhaust gas recirculation amount should rather be decreased to increase the air amount and avoid the oil rising with a view toward assuring a stable operation after fuel cut. The present invention can meet the above demand and provide a stable internal combustion engine operation after fuel cut.

The ninth aspect of the present invention can judge the continuation for a predetermined period of time at the time when the catalyst is saturated with oxygen. Thus, the present invention can create a situation favorable for a stable operation subsequent to fuel cut as soon as possible while substantially protecting the catalyst.

The tenth aspect of the present invention can judge the continuation for a predetermined period of time when the cumulative intake air amount adequate for saturating the downstream catalyst with oxygen is distributed after the lean gas begins to flow downstream of the upstream catalyst positioned in the exhaust path. The above judgment method can exclude the tolerance in the upstream catalyst's oxygen storage amount from judgment. It is therefore possible to substantially increase the accuracy in judging the continuation for a predetermined period of time.

The eleventh aspect of the present invention can set a cumulative intake air amount necessary for saturating the downstream catalyst with oxygen in accordance with the upstream catalyst's oxygen storage capacity. The amount of air required for saturating the downstream catalyst with oxygen is determined according to the downstream catalyst's oxygen storage capacity. Further, there is a high correlation between the downstream catalyst's oxygen storage capacity and the upstream catalyst's oxygen storage capacity. Therefore, the present invention can accurately set a cumulative intake air amount for saturating the downstream catalyst with oxygen.

The twelfth aspect of the present invention can adjust the intake air amount to the cooling purpose flow volume when a fuel cut operation continues for a predetermined period of time, that is, when it is judged that it is no longer necessary to inhibit the air flow to the catalyst. In this instance, catalyst cooling is promoted because a large amount of intake air is allowed to become distributed. While the catalyst temperature is low, the catalyst does not suddenly deteriorate even if it is exposed to a lean gas. In a situation where the catalyst unavoidably becomes saturated with oxygen, the present invention can inhibit the progress of catalyst deterioration by suddenly cooling the catalyst. Further, after the catalyst is thoroughly cooled (after the elapse of a cooling period), the present invention can effectively avoid the oil rising by providing an appropriate intake air amount.

The thirteenth aspect of the present invention can set the cooling time in accordance with the catalyst temperature. Therefore, the present invention can adjust the intake air amount to the cooling purpose flow volume just during an appropriate period during which the situation is adequate for catalyst cooling.

The fourteenth aspect of the present invention can set the EGR adjustment mechanism's operating amount for a fuel cut period in accordance with the previously detected operating speed of the EGR adjustment mechanism. When the operating amount for the fuel cut period is set in accordance with the operating speed of the EGR adjustment mechanism, the EGR adjustment mechanism can be restored to a state suitable for normal operation without undue delay when recovery is achieved from the fuel cut period. Therefore, the present invention can always prevent the internal combustion engine from becoming unstable when recovery is achieved from the fuel cut period.

The fifteenth aspect of the present invention ensures that the intake air amount for a fuel cut period decreases with an increase in the operating amount of the EGR adjustment mechanism. In other words, the present invention can substantially decrease the intake air amount when the operating amount of the EGR adjustment mechanism is large so as to provide an adequate EGR amount, and can increase the intake air amount to some extent when the operating amount of the EGR adjustment mechanism is small so as to provide an inadequate EGR amount. Therefore, the present invention can always create an optimum situation for avoiding the oil rising and providing catalyst protection during a fuel cut period in accordance with a preselected operating amount.

The sixteenth aspect of the present invention can detect the operating speed indicated by the EGR adjustment mechanism in a region where the engine speed exceeds the judgment value. The EGR adjustment mechanism is expected to provide an operating amount that increases with an increase in the engine speed. To ensure that the EGR adjustment mechanism reverts to a state suitable for normal operation without delay when recovery is achieved from a fuel cut period, therefore, it is proper that the operating amount of the EGR adjustment mechanism be set in accordance with the operating speed in a high engine speed region. Since the present invention can meet the above demand, it makes it possible to properly assure the stability of the internal combustion engine when recovery is achieved from a fuel cut period.

The seventeenth aspect of the present invention can detect the operating speed in a region where the judgment value is exceeded, by converting the EGR adjustment mechanism's operating speed measured at an arbitrary engine speed. When this method is used, the operating speed of the EGR adjustment mechanism can be acquired without having to wait until the internal combustion engine enters a high-speed region. Therefore, the present invention can acquire the operating speed of the EGR adjustment mechanism immediately after internal combustion engine startup.

The eighteenth aspect of the present invention can detect the operating speed at a predefined time by converting the EGR adjustment mechanism's operating speed measured at an arbitrary oil temperature. Since the EGR adjustment mechanism uses hydraulic pressure as its drive source, the operating speed varies with the oil temperature. The present invention can properly detect the operating speed at a predefined time without being affected by oil temperature changes. Therefore, the present invention can always provide a stable operating state when recovery is achieved from a fuel cut period.

The nineteenth or twentieth aspect of the present invention can invoke requested intake air amount changes easily and accurately by controlling the throttle-opening angle or idle speed control (ISC) valve flow rate.

BRIEF DESCRIPTION OF DRAWINGS

FIG. 7 is a map illustrating a first correction coefficient kfcta1, which is referenced by the routine shown in FIG. 3.

FIG. 8 is a map illustrating a second correction coefficient kfcta2, which is referenced by the routine shown in FIG. 3.

FIGS. 9A to 9D are timing diagrams that illustrate the operations performed by a second embodiment of the present invention.

FIGS. 13A to 13C are timing diagrams that illustrate the operations performed by a fourth embodiment of the present invention.

BEST MODE FOR CARRYING OUT THE INVENTION

First Embodiment

System Configuration

Figure 1:
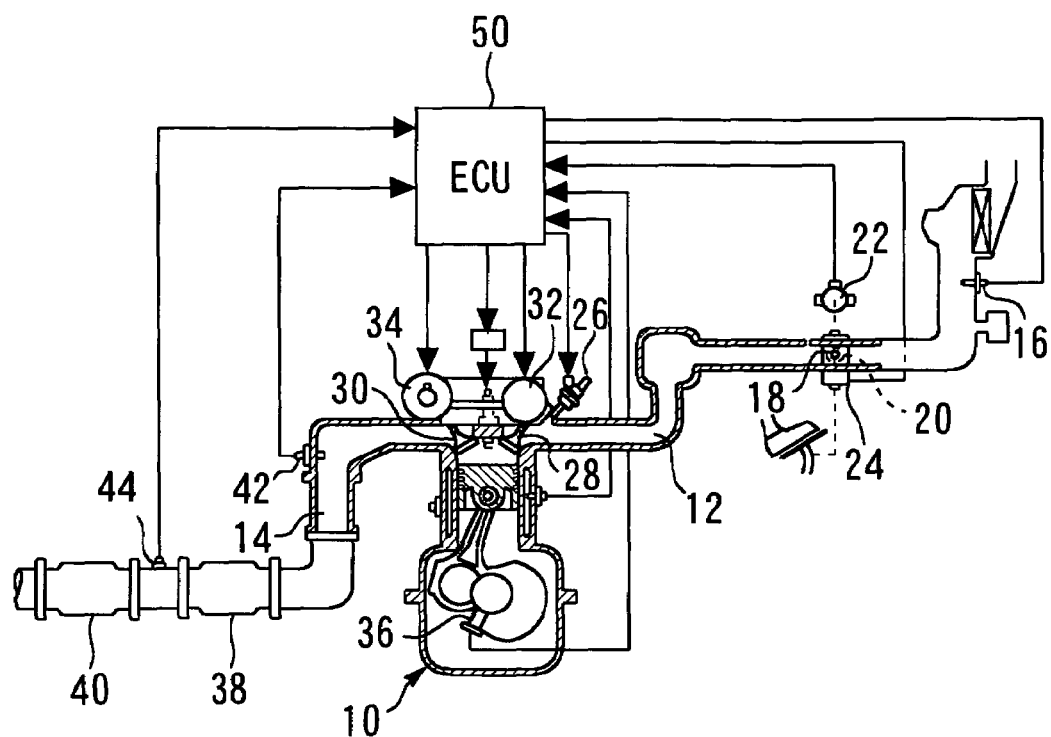
FIG. 1 illustrates the configuration of a first embodiment of the present invention.

FIG. 1 illustrates the configuration of a first embodiment of the present invention. As indicated in FIG. 1, the system according to the first embodiment includes an internal combustion engine 10. The internal combustion engine 10 communicates with an intake path 12 and an exhaust path 14.

The intake path 12 is provided with an air flow meter 16, which detects the amount of air that flows in the intake path 12, that is, an intake air amount Ga, which denotes the amount of air that flows into the internal combustion engine 10. A throttle valve 18 is positioned downstream of the air flow meter 16. The throttle valve 18 is an electronically controlled valve that is driven by a throttle motor 20 in accordance with the accelerator-opening angle. A throttle position sensor 22 for detecting the throttle-opening angle TA and an accelerator position sensor 24 for detecting the accelerator-opening angle AA are positioned near the throttle valve 18.

The internal combustion engine 10 is a multi-cylinder engine, which has a plurality of cylinders. FIG. 1 is a cross-sectional view illustrating one of the plurality of cylinders. Each cylinder in the internal combustion engine 10 is provided with an intake port, which communicates with the intake path 12, and an exhaust port, which communicates with the exhaust path 14. The intake port is provided with a fuel injection valve 26, which injects fuel into the intake port. Further, the intake port and exhaust port are provided with an intake valve 28 and an exhaust valve 30, respectively. The intake valve 28 connects the intake path 12 to the inside of a cylinder or disconnects the intake path 12 from the inside of a cylinder. The exhaust valve 30 connects the exhaust path 14 to the inside of a cylinder or disconnects the exhaust path 14 from the inside of a cylinder.

The intake valve 28 and exhaust valve 30 are respectively driven by variable valve (VVT) mechanisms 32, 34. The variable valve mechanisms 32, 34 can open/close the intake valve 28 and exhaust valve 30 in synchronism with crankshaft rotation and change their valve opening characteristics (valve opening timing, operating angle, lift amount, etc.).

The internal combustion engine 10 has a crank angle sensor 36, which is positioned near a crankshaft. The crank angle sensor 36 alternately generates a Hi output and Lo output each time the crankshaft rotates through a predetermined angle. The output from the crank angle sensor 36 can be used to detect the crankshaft's rotary position and rotation speed, the engine speed NE, and so on.

The exhaust path 14 of the internal combustion engine 10 is provided with an upstream catalyst (SC) 38 and a downstream catalyst (UF) 40. The upstream catalyst (SC) 38 and downstream catalyst (UF) 40 are serially arranged to purify the exhaust gas. An air-fuel ratio sensor 42 is positioned upstream of the upstream catalyst 38 to detect an exhaust air-fuel ratio at its own position. An oxygen sensor 44 is positioned between the upstream catalyst 38 and downstream catalyst 40. The oxygen sensor 44 generates a signal that indicates whether the air-fuel ratio prevailing at its own position is rich or lean.

The system shown in FIG. 1 includes an ECU (Electronic Control Unit) 50. The ECU 50 is connected to the various above-mentioned sensors and actuators. The ECU 50 can control the operating status of the internal combustion engine 10 in accordance with the outputs from the sensors.

Features of First Embodiment (Fuel Cut Operation Performed at High Engine Speed)

When the throttle-opening angle TA is set for idling during an operation of the internal combustion engine 10, the system according to the present embodiment performs a fuel injection stop process, that is, a fuel cut (F/C) process. FIGS. 2A to 2D are timing diagrams that illustrate the operations performed by the present embodiment when the fuel is cut off in an environment where the engine speed NE is sufficiently high.

Figure 2:
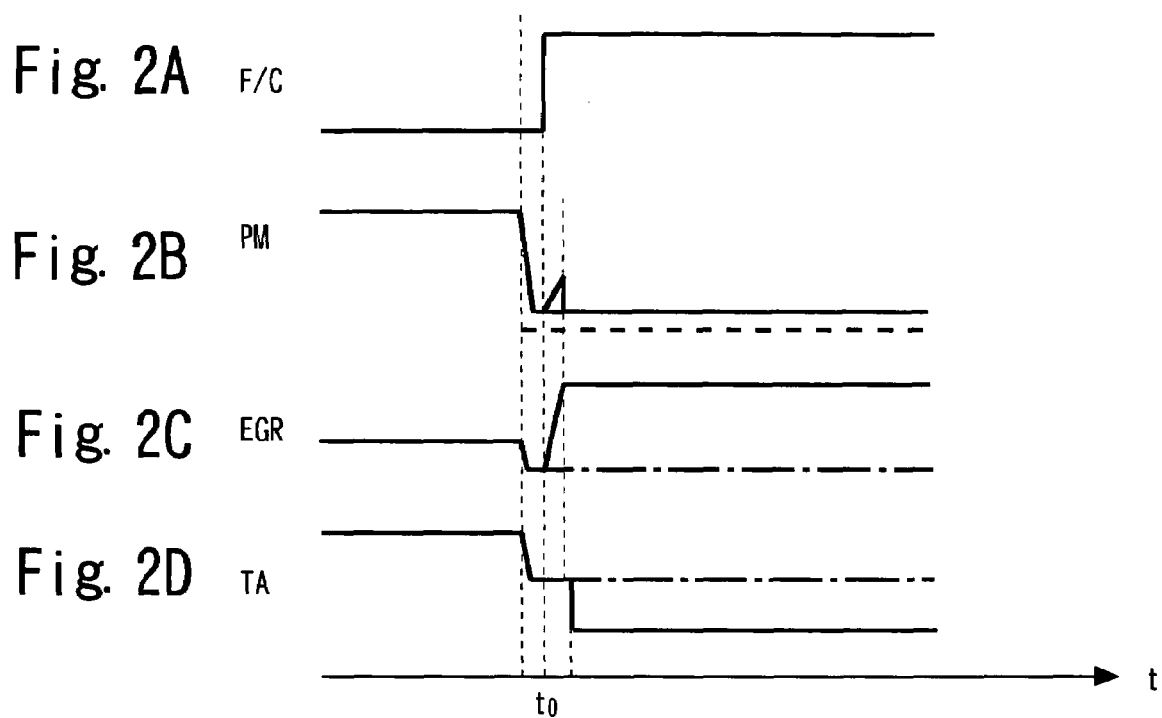
FIGS. 2A to 2D are timing diagrams that illustrate the operations performed by the first embodiment of the present invention when the fuel is cut off in an environment where the engine speed NE is sufficiently high.

More specifically, FIG. 2A shows a waveform that illustrates the fuel cut process. It indicates that the fuel cut process is started at time t0. FIG. 2B shows a waveform that illustrates intake pipe pressure PM. The broken line in FIG. 2B represents an allowable limit for the intake pipe pressure PM that does not cause an oil rising or oil descent. FIG. 2C shows a waveform that illustrates internal EGR (Exhaust Gas Recirculation) changes. FIG. 2D shows a waveform that illustrates changes in the throttle-opening angle TA. This figure shows an example in which the throttle-opening angle TA is suddenly reduced to zero immediately before time t0.

The fuel cut process starts when the throttle-opening angle TA is suddenly reduced to zero during an operation of the internal combustion engine 10. After the start of the fuel cut process, therefore, a situation where the intake pipe pressure PM readily becomes significantly negative is created. If, in this instance, the intake pipe pressure PM becomes negative beyond the allowable limit, an oil rising (the entry of oil into the combustion chamber from the circumference of the piston) or an oil descent (the entry of oil into the combustion chamber from the circumference of the valve stem) occurs in the internal combustion engine 10, thereby increasing the oil consumption amount.

It is possible to prevent the intake pipe pressure PM from becoming negative by increasing the throttle-opening angle TA. Therefore, when the throttle-opening angle TA is maintained greater than the basic idle-opening angle TA0 (idle-opening angle in a low rotation speed region) after the start of fuel cut, particularly in a high rotation speed region where the intake pipe pressure PM is likely to become significantly negative, it is possible to keep the intake pipe pressure PM higher than the allowable limit and avoid an oil rising and oil descent.

However, no fuel injection takes place during the fuel cut process. Therefore, the gas that flows into the catalysts (upstream catalyst 38 and downstream catalyst 40) is extremely lean. When a lean gas flows into high-temperature catalysts, the catalysts may readily deteriorate. Therefore, when the throttle-opening angle TA is increased after the start of fuel cut to increase the amount of lean gas distribution, the deterioration of the upstream catalyst 38 and downstream catalyst 40 is promoted although an increase in the oil consumption amount can be avoided.

When the variable valve mechanism 34 retards the valve opening phase of the exhaust valve 30, the system shown in FIG. 1 can prolong the valve overlap period, that is, the period during which the intake valve 28 and exhaust valve 30 are both open. When the valve overlap period is prolonged, there will be an increase in the amount of burnt gas that flows back to the intake path 14 after the intake valve 28 is opened, that is, the internal EGR amount.

The intake pipe pressure PM approaches the atmospheric pressure when the gas amount prevailing downstream of the throttle valve 18 increases. The gas amount is the sum of the amount of fresh gas passing through the throttle valve 18 and the amount of internal EGR gas generated during the valve overlap period. Therefore, when the internal EGR amount is sufficiently large, the intake pipe pressure PM does become unduly negative no matter whether the throttle-opening angle TA is small.

Further, when the throttle-opening angle TA is reduced while the internal EGR amount is adequate, the burnt gas ratio within a cylinder can be sufficiently increased. When such a situation is created during fuel cut, it is possible to prevent the gas inflow to the catalysts from becoming unduly lean.

As described above, when the throttle-opening angle TA is substantially reduced with a valve overlap generated to provide adequate internal EGR, the system shown in FIG. 1 can effectively inhibit the deterioration of the upstream catalyst 38 and downstream catalyst 40 while avoiding an oil rising and oil descent even if the fuel cut process is started in a high rotation speed region.

When the configuration shown in FIG. 1 is employed, however, the time for actuator operation is required during the time interval between the instant at which an instruction is issued to the variable valve mechanism 34 and the instant at which a desired internal EGR amount is actually obtained, that is, a desired valve overlap is actually obtained. Therefore, the actual internal EGR amount reaches a convergence value as indicated in FIG. 2C when the above-mentioned actuator operation time elapses after the start of fuel cut (after time t0).

If the throttle-opening angle TA is reduced before the internal EGR amount is sufficiently close to the convergence value, the oil rising or oil descent problem inevitably arises. Therefore, as indicated in FIG. 2D, the present embodiment temporarily uses a throttle-opening angle TA that is greater than the basic idle-opening angle TA0 during the time interval between the instant at which the fuel cut process starts and the instant at which the actual internal EGR amount becomes adequate, and reduces the throttle-opening angle TA for correction purposes when the actual internal EGR amount becomes adequate. When the throttle is operated in the above manner, it is possible to prevent the intake pipe pressure PM from becoming unduly negative after the start of fuel cut while keeping the air distribution amount substantially small. Thus, the device according to the present embodiment is capable of effectively preventing the oil consumption amount from increasing and the catalysts from deteriorating when a fuel cut process is performed.

(Fuel Cut Operation Performed at Low Engine Speed)

The operation described above is performed when the fuel cut process is started at a high engine speed. When the engine speed NE is sufficiently high, the normal stable operation state can be recovered before the engine stalls by reducing the valve overlap before the end of fuel cut even if the burnt gas exists in a cylinder at a high ratio during fuel cut and a large valve overlap is provided.

However, if the above situation exists while a fuel cut process is performed in a region where the engine speed NE is low, the internal combustion engine 10 may stall during the time interval between the instant at which the fuel cut process ends and the instant at which the in-cylinder fresh gas ratio becomes sufficiently high. Therefore, when the fuel cut process is performed at a low engine speed NE, the system according to the present embodiment provides a shorter valve overlap period and a larger throttle-opening angle TA than those provided during fuel cut at a high engine speed NE.

When the above process is performed, a situation where a stable operation can be performed can be reproduced immediately after the end of the fuel cut process performed at a low engine speed. Therefore, the system according to the present embodiment can effectively prevent the internal combustion engine 10 from stalling after the end of fuel cut at a low engine speed NE.

Details of Process Performed by First Embodiment

Figure 3:
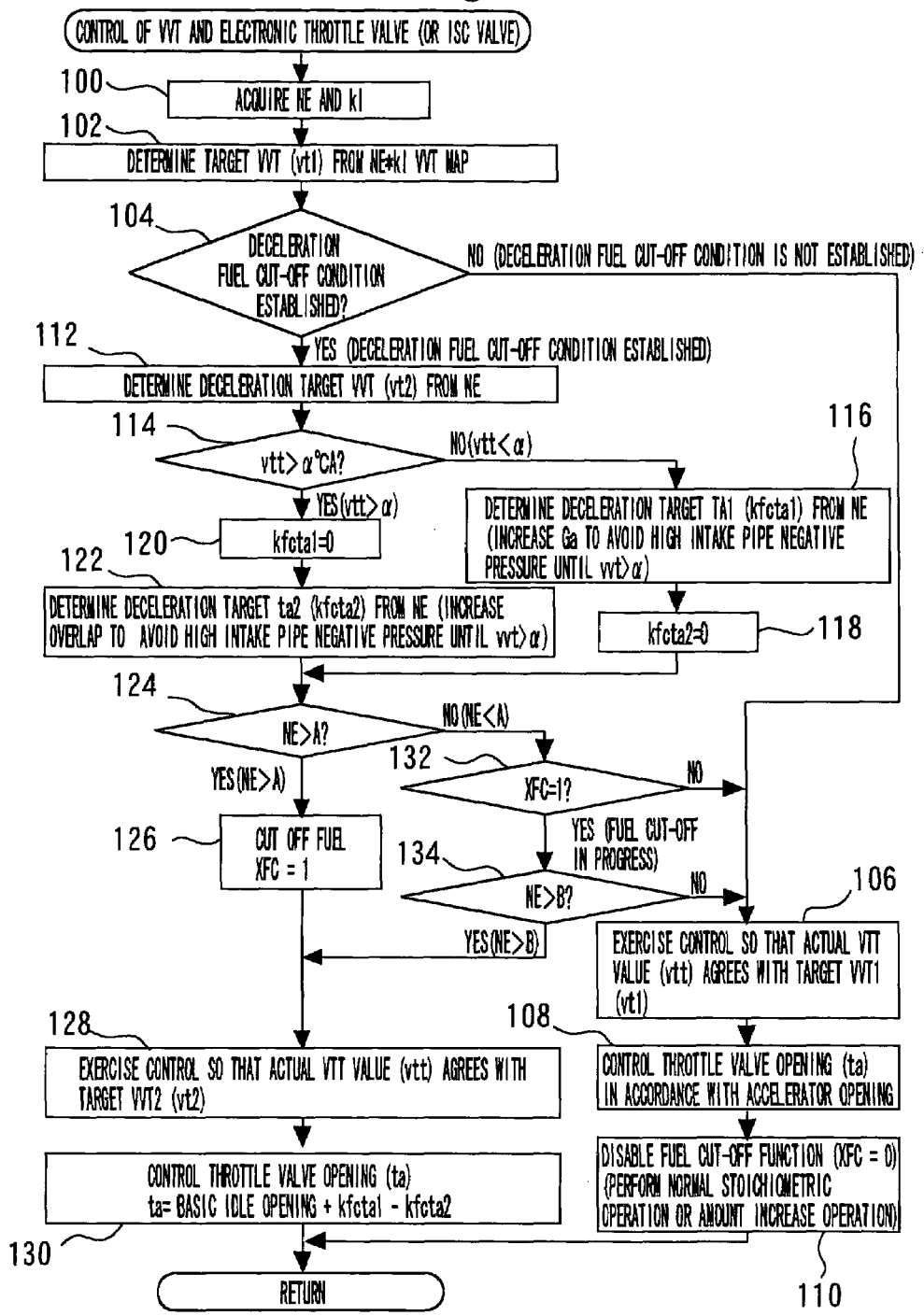
FIG. 3 is a flowchart illustrating a main routine that is executed by the first embodiment of the present invention.

FIG. 3 is a flowchart illustrating a routine that the ECU 50 executes to implement the above functionality in accordance with the present embodiment. In the routine shown in FIG. 3, step 100 is performed first to acquire the engine speed NE and load factor kl. The engine speed NE can be acquired in accordance with an output that is generated by the crank angle sensor 36. The load factor kl is a ratio between the intake air amount obtained when the throttle-opening angle TA is maximized and the actual intake air amount Ga, and can be obtained in accordance, for instance, with the output of the air flow meter 16.

Figures 4, 5, 6:
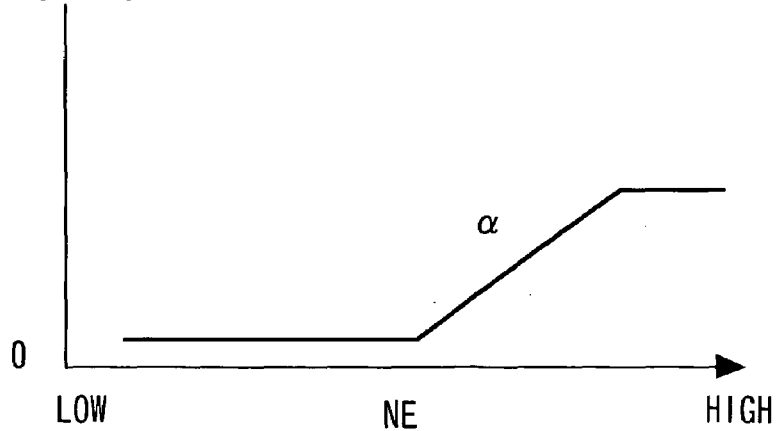
FIG. 4 is a map illustrating a normal target value vt1 that is referenced by the routine shown in FIG. 3.
FIG. 5 is a map illustrating a deceleration target value vt2 that is referenced by the routine shown in FIG. 3.
FIG. 6 is a map illustrating a judgment value α that is referenced by the routine shown in FIG. 3.

Next, step 102 is performed to calculate a normal target value vt1 of the variable valve mechanism 34 in accordance with the engine speed NE and load factor kl. The normal target value vt1 is a target value for valve timing VVT during a normal operation period during which the fuel is not cut off. As indicated in FIG. 4, the ECU 50 stores a map that defines the relationship among the normal target value vt1, engine speed NE, and load factor kl. In step 102, the map is referenced to calculate the normal target value vt1.

In a low load region where the load factor kl is not higher than 10%, the map shown in FIG. 4 indicates that the normal target value vt1 is 0 without regard to the engine speed NE. When a normal target value vt1 of 0 is achieved, no valve overlap occurs. Therefore, no internal EGR gas is generated in a low load region as far as the normal target value vt1 is used.

In the routine shown in FIG. 3, the next step (step 104) is performed to judge whether a deceleration fuel cut condition is established. More specifically, step 104 is performed to judge whether the throttle-opening angle TA is reduced to the basic idle-opening angle TA0.

If the throttle-opening angle TA is greater than the basic idle-opening angle TA0, it is found that the deceleration fuel cut condition is not established. In this instance, step 106 is performed to adjust the valve timing VVT for the normal target value vt1 for the purpose of continuing with a normal operation.

Next, the throttle-opening angle TA is controlled in accordance with the accelerator-opening angle TA0 (step 108). Subsequently, a fuel cut execution flag XFC is set to zero (0) to indicate that the fuel cut function is disabled (step 110). When the above process is performed, the internal combustion engine 10 continuously performs a normal operation in accordance with the amount of accelerator operation performed by the driver.

If, in the routine shown in FIG. 3, the judgment result obtained in step 104 indicates that the deceleration fuel cut condition is established (TA≦TA0), step 112 is performed to calculate a deceleration target value vt2 for valve timing VVT. The deceleration target value vt2 is a value of valve timing VVT that should be attained during deceleration fuel cut.

FIG. 5 shows a typical map that the ECU 50 stores to calculate the deceleration target value vt2. The deceleration target value vt2 is predefined in relation to the engine speed NE. More specifically, the predefined deceleration target value vt2 equals zero (0) when the engine speed is close to the idle rotation speed and increases with an increase in the engine speed NE (until it reaches a maximum of 20).

The deceleration target value vt2 is a target value that is used in a situation where the load factor kl is sufficiently smaller than 10%. In such a situation, the normal target value vt1 is considered to be zero (0) in the entire rotation speed region. Therefore, when compared to the normal target value vt1, the deceleration target value vt2 is set so that it increases with an increase in the engine speed NE.

The system according to the present embodiment is configured so that the valve overlap period becomes longer when the valve timing value VVT increases. The internal EGR amount increases when the valve overlap period becomes longer. In a situation where the valve timing VVT is equal to the deceleration target value vt2, therefore, the valve overlap period increases with an increase in the engine speed NE and decreases toward zero (0) with a decrease in the engine speed NE.

In the routine shown in FIG. 3, the next step (step 114) is performed to judge whether a judgment value (α° CA) is exceeded by the actual valve timing vtt. In the system according to the present embodiment, a certain amount of actuator operation time is required during the time interval between the instant at which an instruction is issued to the variable valve mechanism 34 for the purpose of equalizing the valve timing VVT with the deceleration target value vt2 and the instant at which the valve timing VVT actually equals the deceleration target value vt2. In other words, the system according to the present embodiment requires a certain amount of time during the time interval between the instant at which the deceleration target value vt2 is determined and the instant at which an adequate amount of internal EGR is acquired as needed to prevent the intake pressure from becoming unduly negative. The "vtt>α° CA" condition, which is used in step 112, is substantially used to judge whether the actual valve timing vtt is changed so as to provide a desired internal EGR amount.

FIG. 6 shows a typical map that the ECU 50 stores to set judgment value α. In other words, the ECU 50 references the map shown in FIG. 6 to set judgment value α. According to the map shown in FIG. 6, judgment value α is minimized in a low engine speed region, increased or decreased in proportion to the engine speed in a medium engine speed region, and maximized in a high engine speed region. In the low engine speed region, it is possible to prevent the intake pressure from becoming unduly negative without requiring a large valve overlap. In the high engine speed region, however, a large valve overlap is required to prevent the intake pressure from becoming unduly negative. According to the map shown in FIG. 6, it is possible to precisely set judgment value α for all engine speed regions while considering the above-mentioned differences.

If, in the routine shown in FIG. 3, the judgment result obtained in step 114 does not indicate that vtt>α° CA, it can be concluded that an adequate amount of internal EGR is still not obtained. In this instance, a process is performed to set a first target throttle-opening angle TA1 for deceleration fuel cut. More specifically, step 116 is performed first to calculate a first correction value kfcta1.

In the present embodiment, the ECU 50 uses the following equation to calculate a target value for the throttle-opening angle TA (target ta):

$$\text{Target } ta = \text{basic idle-opening angle } TA0 + \text{first correction coefficient } kfcta1 - \text{second correction coefficient } kfcta2 \quad (1)$$

Equation (1) above indicates that the target ta increases with an increase in the first correction coefficient kfcta1 and decreases with an increase in the second correction coefficient kfcta2. In other words, the first correction coefficient kfcta1 is a correction coefficient for enlarging the target ta, whereas the second correction coefficient kfcta2 is a correction coefficient for reducing the target ta.

FIG. 7 shows a typical map that the ECU 50 stores to calculate the first correction coefficient kfcta1. In step 116, this map is referenced to calculate the first correction coefficient kfcta1. According to this map, the setting for the first correction coefficient kfcta1 increases with an increase in the engine speed NE. When the engine speed NE is close to the idle rotation speed, the first correction coefficient kfcta1 is set to a minimum of 0.

After the first correction coefficient kfcta1 is calculated, the second correction coefficient kfcta2 is set to 0 (step 118). When the above process is performed, the target ta is set to a value that is greater than the basic idle-opening angle TA0, and increases with an increase in the engine speed NE. The target ta, which has the above characteristic, is referred to as the first target throttle-opening angle TA1.

If, in the routine shown in FIG. 3, the judgment result obtained in step 114 indicates that vtt>α° CA, it can be concluded that an adequate amount of internal EGR is already obtained to prevent the intake pressure from becoming unduly negative. In this instance, a process is subsequently performed to calculate a second target throttle-opening angle TA2 for deceleration fuel cut.

First of all, the first correction coefficient kfcta1 is set to 0 (step 120). Next, the map shown in FIG. 8 is referenced to calculate the second correction coefficient kfcta2 (step 122).

According to the map shown in FIG. 8, the second correction coefficient kfcta2 increases with an increase in the engine speed NE and is set to a minimum of 0 when the engine speed NE is close to the idle rotation speed. The second correction coefficient kfcta2 is a correction coefficient for narrowing down the target ta. Therefore, when steps 120 and 122 are performed, the target ta is set to a value that is smaller than the basic idle-opening angle TA0, and increases with an increase in the engine speed NE. The target ta, which has the above characteristic, is referred to as the second target throttle-opening angle TA2.

In the routine shown in FIG. 3, step 124 is performed next to judge whether the engine speed NE is higher than a fuel cut start rotation speed A. If the obtained judgment result indicates that NE>A, the fuel cut execution flag XFC is set to 1 (step 126).

Another routine causes the ECU 50 to monitor the status of the fuel cut execution flag XFC. When the fuel cut execution flag XFC is set to 1, the ECU 50 performs a fuel cut process. Therefore, when step 126 is performed, the internal combustion engine 10 subsequently starts the fuel cut process.

In the routine shown in FIG. 3, control is exercised to set the valve timing VVT to the deceleration target value vt2 (step 128). As a result, the valve timing VVT is corrected in a region where the engine speed NE is high to provide a great valve overlap with a view toward increasing the internal EGR amount.

Next, the throttle valve 18 is controlled so that the throttle-opening angle TA coincides with the target ta that is derived from Equation (1) (step 130). As described earlier, the target ta is set to the first target throttle-opening angle TA1, that is, a value greater than the basic idle-opening angle TA0, before the actual valve timing vtt reaches $\alpha°$ CA. In this instance, the higher the engine speed NE, the larger the throttle-opening angle TA. As a result, it is possible to prevent the intake pressure from becoming unduly negative and avoid an increase in the oil consumption amount even when the amount of internal EGR is inadequate.

After the actual valve timing vtt reaches $\alpha°$ CA, the target ta is set to the second target throttle-opening angle TA2, that is, a value smaller than the basic idle-opening angle TA0. In this instance, the throttle-opening angle TA decreases with an increase in the engine speed NE so that the amount of fresh gas inflow to the upstream catalyst 38 and downstream catalyst 40 decreases. As a result, the deterioration of the upstream catalyst 38 and downstream catalyst 40 is inhibited during fuel cut.

If, in the routine shown in FIG. 3, the judgment result obtained in step 124 does not indicate that NE>A, step 132 is performed to judge whether the fuel cut execution flag XFC is set to 1. If the obtained judgment result indicates that the fuel cut execution flag XFC is set to 1, it can be concluded that fuel cut is already started. In this instance, step 134 is performed to judge whether the engine speed NE is lowered to a fuel cut end rotation speed B.

If the obtained judgment result indicates that the engine speed NE is higher than the fuel cut end rotation speed B, it can be concluded that a fuel cut end condition is still not established. In this instance, steps 128 and 130 are performed again in the order named.

If, on the other hand, the judgment result obtained in step 132 does not indicate that the fuel cut execution flag XFC is set to 1, it can be concluded that the condition for fuel cut initiation is not established. If the judgment result obtained in step 134 does not indicate that NE>B, it can be concluded that the condition for terminating the fuel cut process is established. In these instances, steps 106 to 110 are sequentially followed to perform a normal operation.

As described above, in a region where the engine speed NE is high, the routine shown in FIG. 3 can avoid an increase in the oil consumption amount by enlarging the throttle-opening angle TA during the time interval between the instant at which a fuel cut process starts and the instant at which an adequate amount of internal EGR is obtained. Further, when a fuel cut process is performed in the above-mentioned region and the throttle-opening angle TA is reduced while an adequate amount of internal EGR is obtained, it is possible to avoid an increase in the oil consumption amount and inhibit the catalysts from deteriorating.

In a region where the engine speed NE is low, the routine shown in FIG. 3 can ensure that the valve timing VVT and throttle-opening angle TA are both close to those prevailing during a normal operation even if a fuel cut process is being performed. Therefore, the system according to the present embodiment can properly prevent the internal combustion engine 10 from performing an unstable operation after the end of fuel cut in a low rotation speed region.

The first embodiment, which has been described above, changes the status of the variable valve mechanism 34 for driving the exhaust valve 30 to change the valve overlap period, thereby changing the internal EGR amount. However, the method for changing the internal EGR amount is not limited to the above. For example, the status of the variable valve mechanism 32 for driving the intake valve 28 may alternatively be changed to change the valve overlap period, thereby changing the internal EGR amount.

Further, the method for changing the internal EGR amount is not limited to increasing/decreasing the valve overlap period. If, for instance, the valve closing timing of the exhaust valve 30 is set within a crank angle region before the exhaust top dead center, the amount of residual gas confined within a cylinder during an exhaust stroke increases or decreases when the valve closing timing is advanced or retarded. Therefore, the internal EGR amount may alternatively be increased/decreased by adjusting the valve closing timing of the exhaust valve 30 within a crank angle region before the exhaust top dead center.

The first embodiment, which has been described above, increases the internal EGR amount during fuel cut at a high engine speed NE to prevent the pressure in the intake path 12 from becoming unduly negative and avoid being excessively lean. However, there is an alternative method. More specifically, an alternative is to furnish an EGR mechanism for collecting an exhaust gas that is discharged into the exhaust path 14 and recirculating the exhaust gas in the intake path 12, and perform the same function as mentioned above by increasing the external EGR amount.

The first embodiment, which has been described above, does not start reducing the throttle-opening angle TA for correction purposes until the actual valve timing vtt exceeds the judgment value $\alpha°$ CA, that is, until a certain amount of internal EGR is actually obtained. However, the present invention is not limited to the use of such a method. Alternatively, the throttle-opening angle TA may be reduced for correction purposes after the start of fuel cut so that the amount of throttle opening reduction corresponds to the amount of EGR increase due to an actual increase in the internal (or external) EGR amount.

The first embodiment, which has been described above, controls the magnitude of negative pressure and the rate of air flow to the catalysts by regulating the throttle opening. However, the control targets are not limited to the above. In other words, the magnitude of negative pressure and the rate of air distribution to the catalysts can be controlled by increasing or decreasing the intake air amount Ga. Therefore, the function exercised by the first embodiment can also be implemented by controlling the element for changing the intake air amount as well as the throttle opening. More specifically, the function exercised by the first embodiment can be implemented by changing the lift amount, operating angle, and valve opening timing of the intake valve in a throttleless internal combustion engine. In an internal combustion engine equipped with an idle speed control (ISC) valve that bypasses a throttle valve, the same function can be implemented by changing the ISC valve flow rate.

In the first embodiment, which has been described above, the "fuel cut means" according to the first aspect of the present invention is implemented when the ECU 50 cuts off the fuel at the time of internal combustion engine deceleration; the "EGR control means" according to the first aspect of the present invention and the "VVT control means" according to the third aspect of the present invention are implemented when the ECU 50 performs steps 112 and 128; and the "intake air amount control means" according to the first aspect of the present invention is implemented when the ECU 50 performs steps 122 and 130.

Further, in the first embodiment, which has been described above, the "actual EGR judgment means" according to the second or third aspect of the present invention is implemented when the ECU 50 performs step 114; and the "control delay means" according to the second aspect of the present invention is implemented when the ECU 50 performs steps 120 and 122 after the condition prescribed in step 114 is established.

Furthermore, in the first embodiment, which has been described above, the "intake air amount maintenance means" according to the fourth aspect of the present invention is implemented when the ECU 50 performs steps 116 and 118.

Second Embodiment

Figure 10:
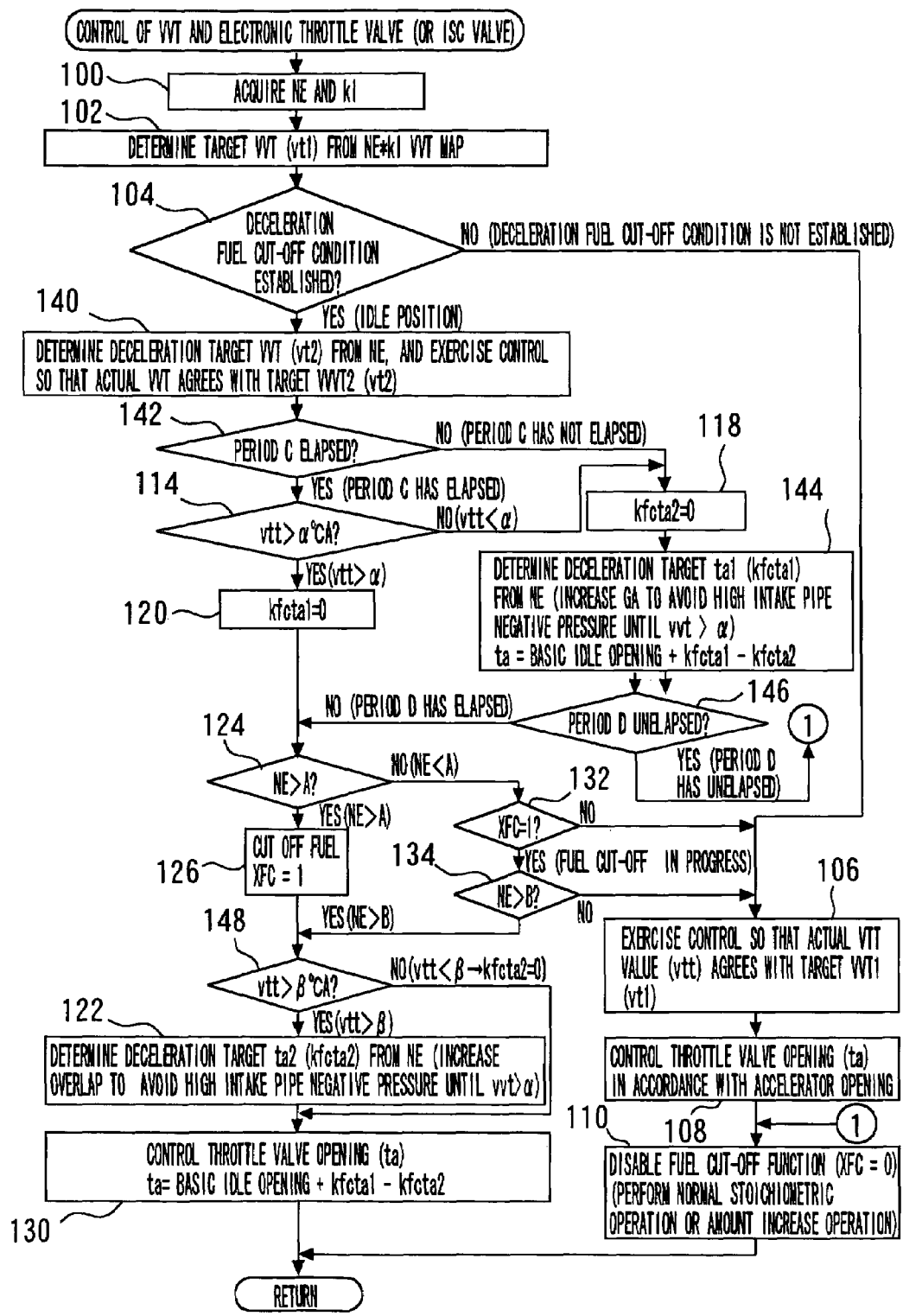
FIG. 10 is a flowchart illustrating a main routine that is executed by the second embodiment of the present invention.

A second embodiment of the present invention will now be described with reference to FIGS. 9A to 9D and 10. The system according to the second embodiment can be implemented by adopting the hardware configuration shown in FIG. 1 and allowing the ECU 50 to execute a routine that is shown in FIG. 10.

Features of Second Embodiment

FIGS. 9A to 9D are timing diagrams illustrating operations typical of the system according to the second embodiment of the present invention. More specifically, FIG. 9A shows a waveform that indicates whether a fuel cut condition is established. FIG. 9B is a diagram illustrating virtual changes (two examples) in the actual valve timing vtt that occur before or after fuel cut condition establishment. FIG. 9C is a diagram illustrating virtual changes (two examples) in the throttle-opening angle TA that correspond to the actual valve timing changes shown in FIG. 9B. FIG. 9D is a diagram illustrating fuel cut execution rules adopted by the present embodiment.

FIG. 9A shows an example in which the fuel cut execution condition is established at time t0. After the fuel cut execution condition is established, the system according to the present embodiment changes the actual valve timing vtt to increase the valve overlap with a view toward increasing the internal EGR amount, as is the case with the system according to the first embodiment.

The waveform indicated by a broken line in FIG. 9B shows an example in which the actual valve timing vtt reaches a judgment value $\alpha°$ CA when a relatively short period of time elapses after time t0. The waveform indicated by a single-dot chain line in FIG. 9B shows an example in which the actual valve timing vtt reaches the judgment value $\alpha°$ CA when a relatively long period of time elapses after time t0.

As is the case with the system according to the first embodiment, the system according to the present embodiment keeps the throttle-opening angle TA larger than the basic idle-opening angle TA0 to prevent the intake pressure from becoming unduly negative before the actual valve timing vtt reaches the judgment value $\alpha°$ CA, and uses a throttle-opening angle TA smaller than the basic idle-opening angle TA0 when the actual valve timing vtt reaches the judgment value $\alpha°$ CA. Therefore, the time for reducing the throttle-opening angle TA varies with the time required for the actual valve timing vtt to reach the judgment value $\alpha°$ CA (see FIG. 9C).

Incidentally, when the above control rules are followed, a relatively large amount of fresh air is distributed to the internal combustion engine 10 during the time interval between the instant at which a fuel cut process starts and the instant at which the throttle-opening angle TA becomes smaller than the basic idle-opening angle TA0. If the fuel is actually cut off when the fuel cut condition is established, a large amount of lean gas flows to the upstream catalyst 38 and downstream catalyst 40, thereby promoting their deterioration. In other words, to inhibit the upstream catalyst 38 and downstream catalyst 40 from deteriorating, it is demanded that the fuel cut process be not actually started before a decrease in the throttle-opening angle TA no matter whether the fuel cut condition is established.

Meanwhile, the vehicle driver expects that the engine brake will generate a braking force when the accelerator pedal is released. To obtain a great braking force in such an instance, it is demanded that a fuel cut process actually start after the fuel cut execution condition is established.

As such being the case, the present embodiment establishes the fuel cut execution rules as indicated in FIG. 9D to meet the above two demands. According to the execution rules shown in FIG. 9D, the fuel cut function is disabled during the time interval between the instant at which the fuel cut execution condition is established and the instant at which time C arrives. Time C arrives when a fuel cut function disable limit period C elapses after time t0. The fuel cut function disable limit period C is the time required for the actual valve timing vtt reaches the judgment value $\alpha°$ CA.

According to the rules indicated in FIG. 9D, the fuel cut function is enabled during the time interval between time C and time D provided that the actual valve timing vtt reaches the judgment value $\alpha°$ CA. After time D, however, the fuel cut function is enabled without regard to the relationship between the actual valve timing vtt and judgment value $\alpha°$ CA. Time D arrives when a disable limit period D elapses after time t0. The disable limit period D denotes the maximum amount of time for delaying the start of fuel cut to ensure that a braking force is generated according to the driver's expectation.

According to the above fuel cut execution rules, the execution of a fuel cut process can be delayed until the actual valve timing vtt reaches the judgment value $\alpha°$ CA, that is, the throttle-opening angle TA becomes smaller than the basic idle-opening angle TA0, as far as the start of fuel cut can be delayed smoothly. If a predetermined period of time D elapses before the value vtt reaches the value $\alpha°$ CA, the fuel cut function can be enabled on the spot to generate a braking force according to the driver's expectation. Consequently, the system according to the present embodiment can properly protect the upstream catalyst 38 and downstream catalyst 40 and produce a braking force according to the driver's expectation.

Details of Process Performed by Second Embodiment

FIG. 10 is a flowchart illustrating a routine that the ECU 50 executes to implement the above functionality. As regards the steps in FIG. 10 that are the same as the steps in FIG. 3, their description is omitted or abridged with the same reference numerals assigned.

According to the routine shown in FIG. 10, steps 100 to 110 are performed, as is the case with the routine shown in FIG. 3, while the deceleration fuel cut condition is not established (while the throttle-opening angle TA is larger than the basic idle-opening angle TA0). As a result, the normal operating state is obtained.

When the throttle-opening angle TA is reduced to the basic idle-opening angle TA0, it is recognized in step 104 that the deceleration fuel cut condition is established. In this instance, step 140 is followed to calculate the deceleration target value vt2 and perform a process for setting the actual valve timing vtt to vt2. The process performed in step 140 will not be described in detail because it is a combination of the processes performed in steps 102 and 128, which are shown in FIG. 3.

In the routine shown in FIG. 10, step 142 is performed next to judge whether the fuel cut function disable limit period C has elapsed after deceleration fuel cut condition establishment. Immediately after deceleration fuel cut condition establishment, it is judged that the fuel cut function disable limit period C has not elapsed. In this instance, the second correction coefficient kfcta2 is set to 0 in step 118, and then step 144 is performed to calculate the first correction coefficient kfcta1 and control the throttle-opening angle TA.

In step 144, the first correction coefficient kfcta1 is calculated by the same method as used in step 116, which is shown in FIG. 3, that is, by referencing the map shown in FIG. 7. Further, the throttle-opening angle TA is controlled while the target ta calculated from Equation (1) is used as a target value as is the case with step 130, which is shown in FIG. 3. Since the first target throttle-opening angle TA1 is calculated from Equation (1), control is exercised so that the throttle-opening angle TA is not smaller than the basic idle-opening angle TA0.

In the routine shown in FIG. 10, step 146 is performed next to judge whether the disable limit period D has not elapsed after deceleration fuel cut condition establishment. If the fuel cut function disable limit period C has not elapsed, it is a matter of course that the disable limit period D has not elapsed either. Therefore, if the fuel cut function disable limit period C has not elapsed, the condition prescribed in step 146 is always established, and the process in step 110 is performed subsequently. As a result, the fuel cut function always remains disabled during the time interval between the instant at which the deceleration fuel cut condition is established and the instant at which the fuel cut function disable limit period C elapses.

If the throttle remains fully closed for the fuel cut function disable limit period C after deceleration fuel cut condition establishment, step 142 is performed to judge whether the fuel cut function disable limit period C has elapsed. In this instance, step 114 is performed next to judge whether the judgment value $\alpha°$ CA is reached by the actual valve timing vtt.

If the judgment value $\alpha°$ CA is still not reached by the actual valve timing vtt at this stage, it is judged in step 114 that the condition is not established, and steps 118, 144, and 146 are performed. As a result, before the elapse of the disable limit period D, control is exercised with the fuel cut function disabled to equalize the throttle-opening angle TA with the first target throttle-opening angle TA1 unless the judgment value $\alpha°$ CA is reached by the actual valve timing vtt.

If the disable limit period D elapses before the actual valve timing vtt reaches the judgment value $\alpha°$ CA, step 146 is performed to judge that the disable limit period D has elapsed. In this instance, step 124 is performed next.

If the engine speed NE is not higher than the fuel cut start rotation speed A when step 124 is performed for the first time after deceleration fuel cut condition establishment, the condition prescribed in step 124 is not established. Further, the condition prescribed in step 132 is not established. In this instance, steps 106 to 110 are performed so that a normal operating state continues without starting a fuel cut process.

If, on the other hand, the engine speed NE is higher than the fuel cut start rotation speed A when step 124 is performed for the first time after deceleration fuel cut condition establishment, the fuel cut execution flag XFC is set to 1 in step 126 to start a fuel cut process. Subsequently, unless the condition prescribed in step 104 is left unestablished, steps 124, 132, and 134 are repeated each time the routine shown in FIG. 10 is started so that a fuel cut process is continuously performed until the engine speed NE lowers to the fuel cut end rotation speed B.

According to the above process, fuel cut can be started when the disable limit period D elapses after deceleration fuel cut condition establishment even if a long period of time is required for the actual valve timing vtt to reach $\alpha°$ CA. Therefore, in a situation where the driver expects that a braking force will be generated by releasing the accelerator, the system according to the present embodiment can produce a braking force according to the driver's expectation without causing the driver to feel significant discomfort.

While a fuel cut process is being performed, step 148 is performed, subsequently to step 126 or 134, to judge whether a second judgment value $\beta°$ CA is exceeded by the actual valve timing vtt. The second judgment value $\beta°$ CA is greater than the judgment value $\alpha°$ CA and smaller than the deceleration target value vt2. Therefore, in a situation where the judgment value $\alpha°$ CA is not reached by the actual valve timing vtt and a fuel cut process is performed due to the elapse of the disable limit period D, it is a matter of course that the actual valve timing vtt is not greater than the second judgment value $\beta°$ CA.

In the above instance, step 130 is performed, without performing step 122, to control the throttle-opening angle TA. In a situation where the judgment value $\alpha°$ CA is not reached by the actual valve timing vtt, steps 118 and 144 are performed so that the target ta is set to the first target throttle-opening angle TA1. Therefore, before the actual valve timing vtt reaches the judgment value $\alpha°$ CA, the throttle-opening angle TA is maintained greater than the basic idle-opening angle TA0 even after the start of fuel cut.

After the fuel cut function disable limit period C has elapsed with the judgment value $\alpha°$ CA is reached by the actual valve timing vtt, the first correction coefficient kfcta1 is set to 0 in step 120 no matter whether the disable limit period D has elapsed. The first correction coefficient kfcta1 is a correction coefficient for enlarging the throttle-opening angle TA. Therefore, after the first correction coefficient kfcta1 is set to 0, the throttle-opening angle TA is maintained smaller than the basic idle-opening angle TA0.

When the above process is performed, it is possible to prevent a large amount of fresh air from readily flowing inward for a prolonged period of time and bring about a favorable situation for inhibiting the upstream catalyst 38 and downstream catalyst 40 from deteriorating after the judgment value $\alpha°$ CA is reached by the actual valve timing vtt, that is, after a situation for acquiring a certain amount of internal EGR is created.

If NE>A or XFC=1 when vtt>$\alpha°$ CA, the fuel is cut off while the first correction coefficient kfcta1 is 0. While the fuel is cut off, step 148 is performed to judge whether vtt>$\beta°$ CA each time the routine shown in FIG. 10 is started.

As a result, step 122 is skipped during the time interval between the instant at which the actual valve timing vtt exceeds the judgment value $\alpha°$ CA and the instant at which the actual valve timing vtt reaches the second judgment value $\beta°$ CA. In this instance, step 130 is performed to calculate the target ta while the first correction coefficient kfcta1 and second correction coefficient kfcta2 are both set to 0. Therefore, control is exercised so that the throttle-opening angle TA is equal to the basic idle-opening angle TA0.

The above process makes it possible to provide an appropriate throttle-opening angle TA that does not permit an unduly large amount of fresh air to become distributed and prevents the intake pipe pressure PM from becoming unduly negative in a situation where the actual valve timing vtt has exceeded the judgment value α° CA and is not sufficiently close to the deceleration target value vt2, that is, the obtained internal EGR amount is inadequate.

When the actual valve timing vtt reaches the second judgment value β° CA while the deceleration fuel cut condition is established, it is recognized that the condition prescribed in step 148 is established. In this instance, step 130 is performed after the second correction coefficient kfcta2 is calculated in step 122 (the calculation method is the same as used in step 122, which is shown in FIG. 3).

When step 130 is performed subsequently to step 122, control is exercised so that the throttle-opening angle TA is equal to the second target throttle-opening angle TA2. Therefore, after the second judgment value β° CA is reached by the actual valve timing vtt, the throttle-opening angle TA can be rendered smaller than the basic throttle-opening angle TA0. The above process makes it possible to reduce the throttle-opening angle TA and avoid an oil rising (oil descent) and catalyst deterioration when a situation for acquiring an adequate internal EGR amount is created.

As described above, the routine shown in FIG. 10 makes it possible to disable the fuel cut function while maintaining a large throttle-opening angle TA during the time interval between the instant at which the deceleration fuel cut condition is established and the instant at which a certain amount of internal EGR is obtained (vtt>α° CA). Therefore, the device according to the present embodiment can effectively avoid an increase in the oil consumption amount and prevent the upstream catalyst 38 and downstream catalyst 40 from deteriorating even before the actual valve timing vtt reaches the judgment value α° CA.

Further, the routine shown in FIG. 10 can initiate a fuel cut process when the disable limit period D elapses after deceleration fuel cut condition establishment no matter whether the judgment value α° CA is reached by the actual valve timing vtt. Consequently, the system according to the present embodiment can properly generate a braking force according to the driver's expectation.

Furthermore, the routine shown in FIG. 10 can gradually reduce the throttle-opening angle TA in accordance with an increase in the actual valve timing vtt after deceleration fuel cut condition establishment. Therefore, the device according to the present embodiment can avoid an oil rising (oil descent) and inhibit the deterioration of the catalysts with higher effectiveness than the device according to the first embodiment.

In the second embodiment, which has been described above, the "actual EGR judgment means" according to the fifth aspect of the present invention is implemented when the ECU 50 judges in step 114, which is shown in FIG. 10, that vtt>α° CA; and the "fuel cut function disable means" according to the fifth aspect of the present invention is implemented when step 110, which is shown in FIG. 10, is performed in a situation where the ECU 50 does not judge that vtt>α° CA.

Further, in the second embodiment, which has been described above, the "fuel cut function enable means" according to the sixth aspect of the present invention is implemented when the ECU 50 performs step 146.

Third Embodiment

Features of Third Embodiment

Figure 11A:
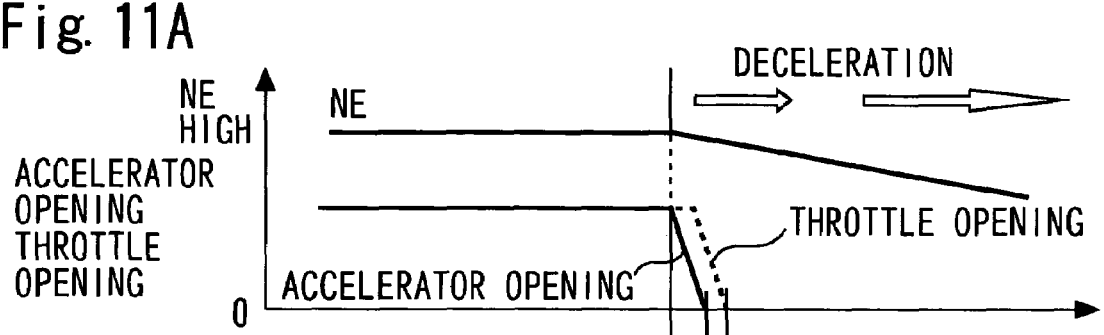
FIGS. 11A and 11B are timing diagrams illustrating the features of a third embodiment of the present invention.

A third embodiment of the present invention will now be described with reference to FIGS. 11A, 11B, and 12.

Figure 12:
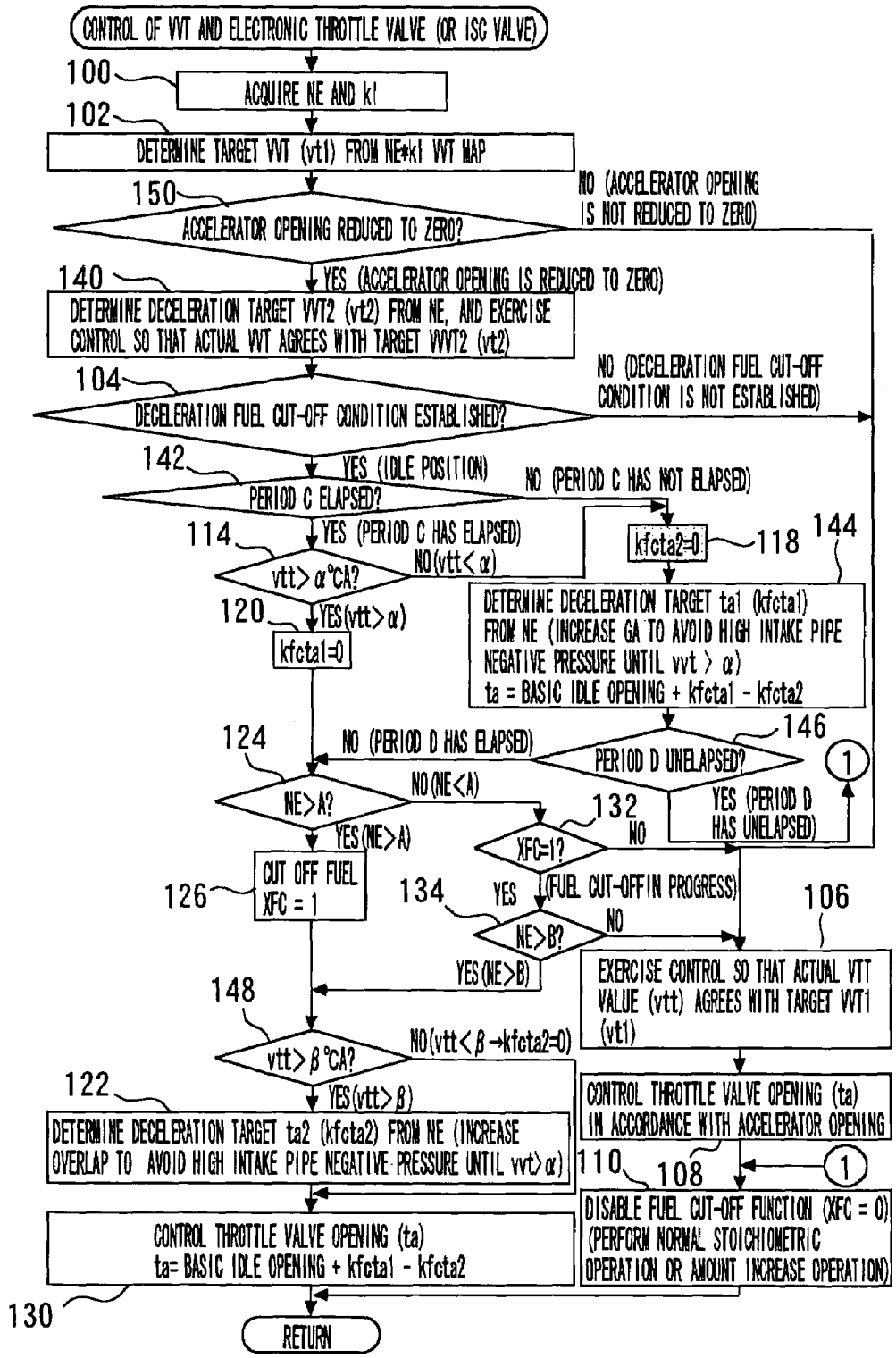
FIG. 12 is a flowchart illustrating a main routine that is executed by the third embodiment of the present invention.

The system according to the third embodiment can be implemented by adopting the hardware configuration shown in FIG. 1 and allowing the ECU 50 to execute a routine that is shown in FIG. 12.

As is the case with the system according to the first or second embodiment, the system according to the third embodiment adopts a configuration in which the throttle-opening angle TA is electronically controlled in accordance with the accelerator-opening angle TA0. FIG. 11A is a timing diagram that indicates how a change in the accelerator-opening angle TA0 is reflected in a change in the throttle-opening angle TA while the configuration according to the third embodiment is employed. This diagram indicates that, in the system for electronically controlling the throttle-opening angle TA, a change in the accelerator-opening angle TA0 affects the throttle-opening angle TA with a certain amount of delay (hereinafter referred to as Δt).

Figure 11B:
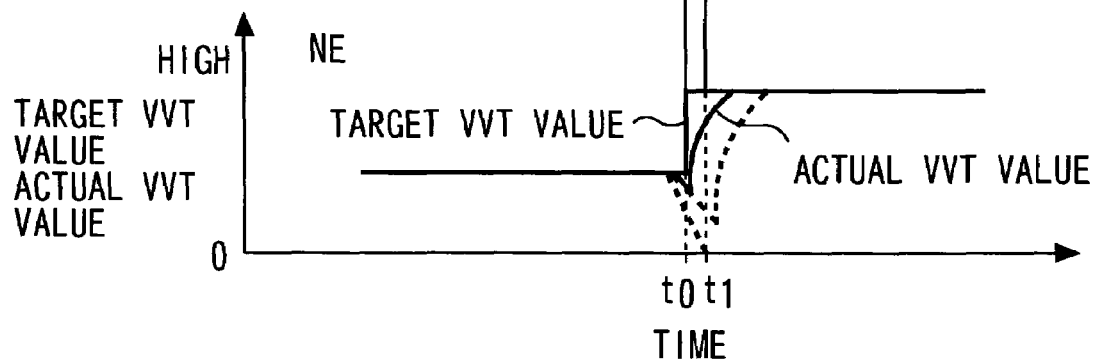

FIG. 11B illustrates the target valve timing value (target VVT value) and actual valve timing value (actual VVT value), and compares the values prevailing when the accelerator-opening angle TA0 is used to judge whether the deceleration fuel cut condition is established against the values prevailing when the throttle-opening angle TA is used to judge whether the deceleration fuel cut condition is established. When the accelerator-opening angle TA0 is used for judgment purposes, the target VVT value increases when the accelerator-opening angle TA0 is reduced to zero at time t0, and the actual VVT value immediately begins to change (see the waveform indicated by a solid line). When, on the other hand, the throttle-opening angle TA is used for judgment purposes, the target VVT value does not increase until the delay time Δt elapses after time t0 (until time t1). Therefore, the actual VVT value remains unchanged until time t1 (see the waveform indicated by a broken line).

As is the case with the device according to the second embodiment, the device according to the present embodiment changes the actual valve timing vtt until it is equal to the deceleration target value vt2 when the internal combustion engine 10 decelerates. When the actual valve timing vtt is changing, the fuel cut function is disabled until the value vtt reaches the judgment value α° CA. Further, control is exercised so that the throttle-opening angle TA is equal to the first target throttle-opening angle TA1. In this instance, the shorter the time required for the value vtt to reach the judgment value α° CA, the earlier the fuel cut process starts. As a result, the fuel consumption characteristic and engine brake response are improved.

As such being the case, the system according to the present embodiment monitors the accelerator-opening angle TA0. When the accelerator-opening angle TA0 is reduced to zero, the system concludes that the internal combustion engine 10 is requested to decelerate, and begins to exercise control so that the actual valve timing vtt agrees with the deceleration target value vt2.

Details of Process Performed by Third Embodiment

FIG. 12 is a flowchart illustrating a routine that the ECU 50 executes to implement the above functionality in accordance with the present embodiment. The routine shown in FIG. 12 is similar to the routine shown in FIG. 10 except that step 150 is included, and that step 140 is performed subsequently to step 150. As regards the steps in FIG. 12 that are the same as the steps in FIG. 10, their description is omitted or abridged with the same reference numerals assigned.

In the routine shown in FIG. 12, step 150 is performed, subsequently to step 102, to judge whether the accelerator-opening angle TA0 is reduced to zero. If the obtained judgment result does not indicate that the accelerator-opening angle TA0 is reduced to zero, it is concluded that an operation in which the fuel is cut off is not requested by the driver. In this instance, steps 106 to 110 are performed so that a normal operating state continues.

If, on the other hand, it is recognized that the accelerator-opening angle TA0 is reduced to zero, it is concluded that an operation in which the fuel is cut off is requested by the driver. In this instance, step 140 is followed to perform a process for ensuring that the actual valve timing vtt agrees with the deceleration target value vt2. Subsequently, steps 104 and beyond are performed.

When the above process is performed, the actual valve timing vtt can immediately begin to change toward the deceleration target value vt2 without waiting for an accelerator opening change to affect the throttle-opening angle TA after the accelerator-opening angle TA0 is reduced to zero by the driver. Therefore, the system according to the present embodiment can improve the fuel cut start response in marked contrast to the system according to the second embodiment. As a result, the fuel consumption characteristic and deceleration response of the internal combustion engine 10 can be improved.

The third embodiment, which has been described above, assumes that the idea for setting the timing in which the deceleration target value vt2 is employed as the target value for the valve timing VVT in accordance with the accelerator-opening angle TA0 is combined with the system according the second embodiment. However, combination target is not limited to the system according to the second embodiment. More specifically, the idea may be incorporated into the system according to the first embodiment.

In the third embodiment, which has been described above, the "throttle opening electronic control means" according to the seventh aspect of the present invention is implemented when the ECU 50 electronically controls the throttle-opening angle TA in accordance with the accelerator-opening angle TA0; and the "fuel cut means" according to the seventh aspect of the present invention is implemented when the ECU 50 performs step 150 as a part of the process for judging whether the fuel should be cut off.

Fourth Embodiment

Features of Fourth Embodiment

A fourth embodiment of the present invention will now be described with reference to FIGS. 13A, 13B, 13C, 14, 15, 16, and 17.

Figure 14:
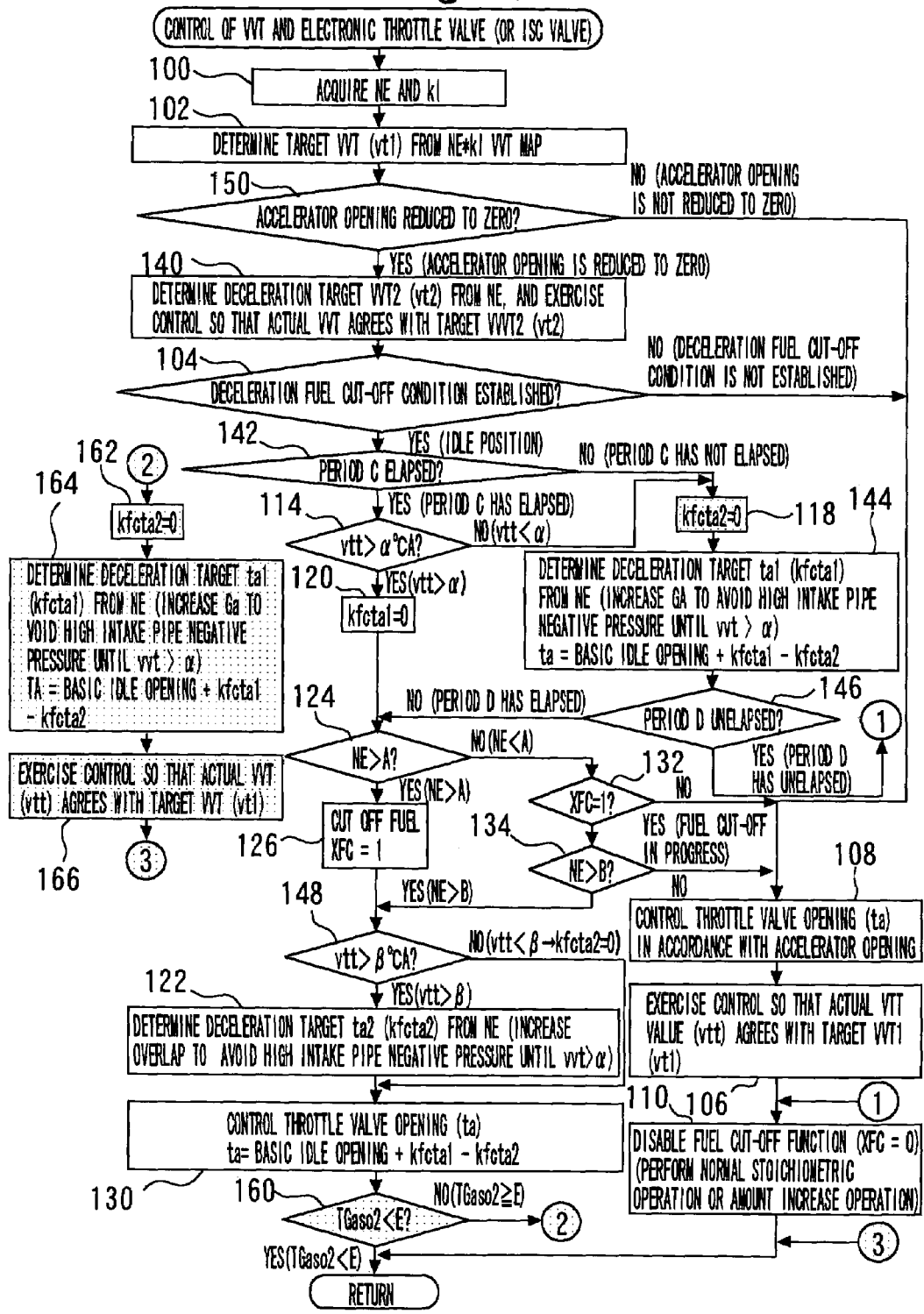
FIG. 14 is a flowchart illustrating a main routine that is executed by the fourth embodiment of the present invention.
Figure 15:
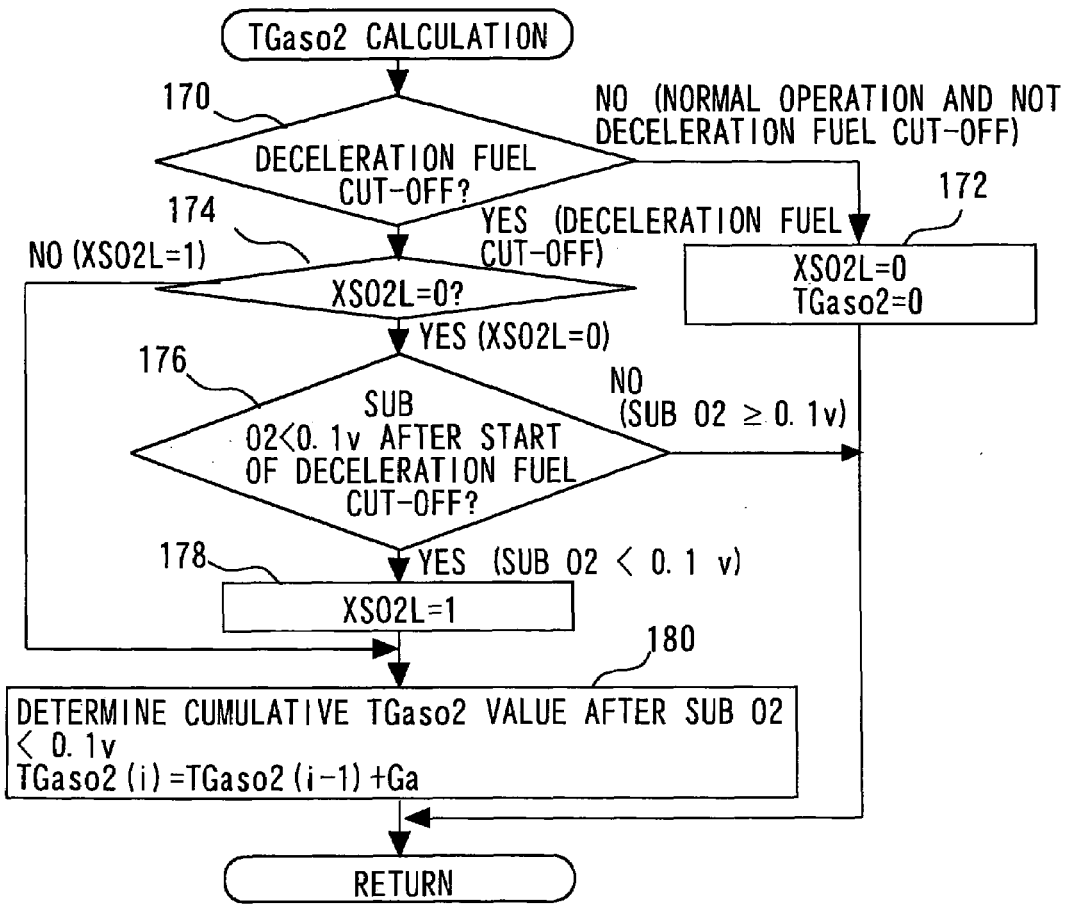
FIG. 15 is a flowchart illustrating a routine that is executed to calculate a lean gas inflow cumulative value TGaso2 in accordance with the fourth embodiment of the present invention.
Figure 16:
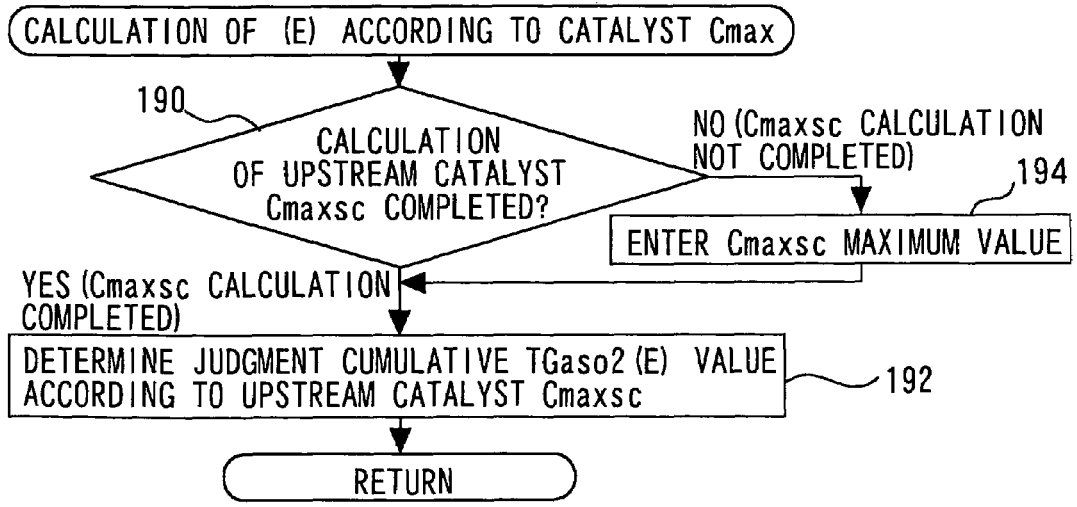
FIG. 16 is a flowchart illustrating a routine that is executed to calculate a saturation judgment value E in accordance with the fourth embodiment of the present invention.

The system according to the fourth embodiment can be implemented by adopting the hardware configuration shown in FIG. 1 and allowing the ECU 50 to execute a routine that is shown in FIGS. 14 to 16.

FIGS. 13A to 13C are timing diagrams that outline the operations performed by the system according to the present embodiment. More specifically, FIG. 13A shows a waveform that illustrates a state in which the fuel cut function is executed. FIG. 13B shows a waveform that indicates the oxygen storage amount $OSA_{SC}$ of the upstream catalyst 38.

FIG. 13C shows a waveform that indicates the oxygen storage amount $OSA_{UF}$ of the downstream catalyst 40.

While the fuel cut function is executed, the gas that flows to the catalysts is lean. Therefore, the oxygen storage amount $OSA_{SC}$ of the upstream catalyst 38 begins to increase immediately after the start of fuel cut as indicated in FIG. 13B. The oxygen storage amount $OSA_{SC}$ eventually converges to the maximum oxygen storage amount $Cmax_{SC}$ of the upstream catalyst 38 as far as the fuel cut function is continuously executed.

When the fuel is continuously cut off after the maximum oxygen storage amount $Cmax_{SC}$ is reached by the oxygen storage amount $OSA_{SC}$ of the upstream catalyst 38, a lean gas begins to flow downstream of the upstream catalyst 38 so that the oxygen storage amount $OSA_{UF}$ of the downstream catalyst 40 begins to increase. The oxygen storage amount $OSA_{UF}$ of the downstream catalyst 40 subsequently converges to the maximum oxygen storage amount $Cmax_{UF}$ of the downstream catalyst 40 as far as the fuel cut function is continuously executed.

As described earlier, the upstream catalyst 38 and downstream catalyst 40 are likely to progressively deteriorate when a supplied lean gas is received in a high-temperature environment. This progressive deterioration mainly occurs during a process in which the upstream catalyst 38 and downstream catalyst 40 occlude oxygen. Therefore, after the oxygen occluded by the upstream catalyst 38 and downstream catalyst 40 reaches its saturation, the catalysts 38, 40 virtually stop their progressive deterioration even when a lean gas is supplied in a high-temperature environment.

It is important from the viewpoint of catalyst protection that the intake air amount Ga be decreased by reducing the throttle-opening angle TA during the time interval between the instant at which a fuel cut process starts and the instant at which the oxygen occluded by the downstream catalyst 40 reaches its saturation. However, such importance does not always prevail after the oxygen occluded by the downstream catalyst 40 reaches its saturation.

If the throttle-opening angle TA is reduced during fuel cut, it is demanded that the throttle-opening angle TA be restored to normal after the end of fuel cut. To reduce the throttle-opening angle TA while preventing the intake pipe pressure PM from becoming unduly negative, the present embodiment adjusts the actual valve timing vtt so as to provide an adequate valve overlap. Therefore, the recovery from fuel cut in a state where the throttle-opening angle TA is reduced means the recovery from a state where a great valve overlap is generated with the throttle-opening angle TA reduced.

If the fuel cut process terminates in a situation where a great valve overlap is generated, a large amount of internal EGR arises for a certain period of time after recovery from fuel cut. Further, if the fuel cut process terminates in a situation where the throttle-opening angle TA is reduced, the amount of fresh air inflow to the cylinder is rendered small for a certain period of time after recovery from fuel cut. Therefore, if the throttle-opening angle TA is reduced till the end of fuel cut with a great valve overlap maintained, the operating state of the internal combustion engine 10 is likely to become unstable upon recovery from fuel cut.

Consequently, if there is no benefit of reducing the throttle-opening angle TA or maintaining a valve overlap, it is preferred that the throttle-opening angle TA be restored to normal before the end of fuel cut, and that the valve timing VVT be restored to the timing for normal operation. For reasons stated above, the present embodiment restores the throttle-opening angle TA to normal and the valve timing VVT to the normal timing when it is estimated during fuel cut that the maximum oxygen storage amount $Cmax_{UF}$ is reached by the oxygen storage amount $OSA_{UF}$ of the downstream catalyst 40.

Details of Process Performed by Fourth Embodiment

FIG. 14 is a flowchart illustrating a main routine that the ECU 50 executes to implement the above functionality in accordance with the present embodiment. The routine shown in FIG. 14 is similar to the routine shown in FIG. 12 except that steps 160 to 166 are added. As regards the steps in FIG. 14 that are the same as the steps in FIG. 12, their description is omitted or abridged with the same reference numerals assigned.

In other words, the routine shown in FIG. 14 constantly performs step 130 during fuel cut as is the case with the routine shown in FIG. 13. Further, the routine shown in FIG. 14 performs step 160 after completion of step 130 to judge whether the cumulative amount of lean gas inflow TGaso2 to the downstream catalyst 40 is smaller than the saturation judgment value E.

FIG. 15 is a flowchart illustrating a routine that the ECU 50 executes to calculate the cumulative amount of lean gas inflow TGaso2 to the downstream catalyst 40. The routine shown in FIG. 15 is a regular interrupt routine that is repeatedly executed at predetermined time intervals.

In the routine shown in FIG. 15, step 170 is performed first to judge whether a deceleration fuel cut process is being performed. If the obtained judgment result indicates that the fuel is not being cut off, a lean judgment flag XSO2L and lean gas inflow cumulative amount TGaso2 are both reset to zero (step 172).

If, on the other hand, the judgment result obtained in step 170 indicates that the fuel is being cut off, step 174 is performed to judge whether the lean judgment flag XSO2L is 0 (zero). If it is recognized that XSO2L=0, step 176 is performed next to judge whether the output of the oxygen sensor 44 is below 0.1 V after the start of fuel cut, that is, a lean output is generated by the oxygen sensor 44 after the start of fuel cut.

If the obtained judgment result indicates that a lean output is not generated by the oxygen sensor 44, it can be concluded that no lean gas has begun to flow downstream of the upstream catalyst 38, that is, no lean gas has begun to flow to the downstream catalyst 40. In this instance, the current processing cycle comes to an end without performing any further process.

If, on the other hand, the judgment result obtained in step 176 indicates that a lean output is generated by the oxygen sensor 44, it can be concluded that a lean gas has begun to flow to the downstream catalyst 40. In this instance, the lean judgment flag XSO2L is set to 1 (step 178). Next, the intake air amount Ga provided during the execution cycle of the current routine is added to the cumulative amount TGaso2(i−1) provided during the previous processing cycle to calculate the latest cumulative value TGaso2(i) (step 180).

Subsequently, each time the routine shown in FIG. 15 is started, the judgment result obtained in step 174 indicates that the lean judgment flag XSO2L is not equal to 0. This condition persists until the fuel cut process terminates. As a result, the routine skips steps 176 and 178, and repeatedly performs step 180.

When the above process is performed, the cumulative value of the intake air amount Ga that is provided after a lean gas has begun to flow downstream of the upstream catalyst 38 can be calculated as the lean gas inflow cumulative amount TGaso2 after the start of fuel cut.

FIG. 16 is a flowchart illustrating a routine that the ECU 50 executes to calculate a saturation judgment value E, which is used in step 160. In the routine shown in FIG. 16, step 190 is performed first to judge whether the maximum oxygen storage amount $Cmax_{SC}$ of the upstream catalyst 38 is already calculated.

In the present embodiment, the ECU 50 can calculate the maximum oxygen storage amount $Cmax_{SC}$ of the upstream catalyst 38 by a well-known method with appropriate timing during an operation of the internal combustion engine 10. More specifically, the ECU 50 can calculate the maximum oxygen storage amount $Cmax_{SC}$ of the upstream catalyst 38 by exercising well-known active control on the basis of the output of the air-fuel ratio sensor 42 and the output of the oxygen sensor 44.

Above described step 190 is performed to judge whether the above-mentioned calculation is already completed, that is, the maximum oxygen storage amount $Cmax_{SC}$ of the upstream catalyst 38 is already calculated. If the obtained judgment result indicates that the value $Cmax_{SC}$ is already calculated, step 194 is performed to calculate the saturation judgment value E in accordance with the value $Cmax_{SC}$. The saturation judgment value E is used for comparison with the lean gas inflow cumulative amount TGaso2.

The saturation judgment value E is set so that it coincides with the lean gas inflow cumulative amount TGaso2 required for the oxygen occluded by the downstream catalyst 40 to reach a saturation level. The larger the maximum oxygen storage amount $Cmax_{UF}$ of the downstream catalyst 40, the larger the lean gas inflow cumulative amount TGaso2. The system according to the present embodiment does not have a function for directly detecting the maximum oxygen storage amount $Cmax_{UF}$. However, the maximum oxygen storage amount $Cmax_{UF}$ of the downstream catalyst 40 varies in accordance with catalyst deterioration as is the case with the maximum oxygen storage amount $Cmax_{SC}$ of the upstream catalyst 38. Therefore, there is a significant correlation between the values $Cmax_{UF}$ and $Cmax_{SC}$. As such being the case, the present embodiment sets the saturation judgment value E in accordance with the maximum oxygen storage amount $Cmax_{SC}$ of the upstream catalyst 38, which indirectly correlates to the saturation judgment value E.

Figure 17:
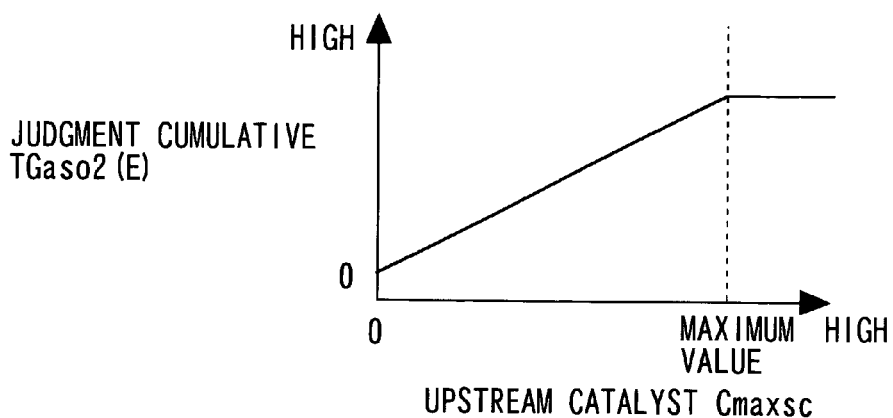
FIG. 17 is a map illustrating the saturation judgment value E that is referenced by the routine shown in FIG. 16.

FIG. 17 is a typical map that the ECU 50 references when the saturation judgment value E is to be set according to the above method. In step 192, the ECU 50 references the map shown in FIG. 17 to calculate the saturation judgment value E for the lean gas inflow cumulative value TGaso2 in accordance with the maximum oxygen storage amount $Cmax_{SC}$ of the upstream catalyst 38. According to this map, the setting for the saturation judgment value E increases with an increase in the maximum oxygen storage amount $Cmax_{SC}$ of the upstream catalyst 38.

The maximum oxygen storage amount $Cmax_{SC}$ of the upstream catalyst 38 is executed during an operation of the internal combustion engine 10 and in an environment where a predefined condition is established. Therefore, its calculation may not be completed at the time when the process in step 190 is called for. In such an instance, the maximum conceivable value is set as the maximum oxygen storage amount $Cmax_{SC}$ of the upstream catalyst 38 (step 194), and step 192 is performed in accordance with the resulting maximum $Cmax_{SC}$ value. When the maximum $Cmax_{SC}$ value is used as the basis, the setting for the saturation judgment value E is maximized. When this process is performed, the value $Cmax_{SC}$ is still not calculated. Therefore, it is possible to prevent an excessively small value from being set as the saturation judgment value E.

Step 160, which is shown in FIG. 14, is performed to judge whether the lean gas inflow cumulative amount TGaso2 that is calculated as described-above is smaller than the saturation judgment value E that is set as described above. This judgment step is performed substantially to determine whether the oxygen storage amount $OSA_{UF}$ of the downstream catalyst 40 is smaller than its maximum oxygen storage amount $Cmax_{UF}$.

If it is judged that TGaso2<E, it can be concluded that the oxygen occluded by the downstream catalyst 40 has not reached its saturation. In this instance, the routine shown in FIG. 14 terminates the current processing cycle without performing any further process, that is, while a great valve overlap is provided with the throttle-opening angle TA reduced.

If the oxygen occluded by the downstream catalyst 40 has not reached its saturation, there is a benefit of reducing the throttle-opening angle TA for downstream catalyst protection purposes. While there is such a benefit, the throttle-opening angle TA can be kept reduced during a series of processes described above. Therefore, the device according to the present embodiment can provide catalyst protection as is the case with the device according to the third embodiment.

If the judgment result obtained in step 160 does not indicate that TGaso2<E, control is exercised so that the throttle-opening angle TA is set to the first target throttle-opening angle TA1 (step 164). Next, step 166 is performed so that the actual valve timing vtt is set as the normal target value vt1. The processes performed in steps 164 and 166 will not be described in detail because they are identical with those performed in steps 144 and 106, respectively.

After the oxygen occluded by the downstream catalyst 40 has reached its saturation, that is, reducing the throttle-opening angle TA is no longer beneficial, the process described above makes it possible to create a situation where no oil rising (oil descent) occurs by restoring the valve overlap to its normal value and enlarging the throttle-opening angle TA. When such a situation is created before the end of fuel cut, it is possible to enhance the stability of the internal combustion engine 10 upon recovery from fuel cut without incurring any disadvantage.

The fourth embodiment, which has been described above, restores the throttle-opening angle TA to normal and the valve overlap to its normal value when the judgment result obtained in step 160 does not indicate that TGaso2<E. However, the present invention is not limited to such an operation. An alternative is to restore the throttle-opening angle TA to normal and the valve overlap to its normal value simply when a fuel cut process is performed for a predetermined period of time.

When the cumulative amount of lean gas inflow TGaso2 to the downstream catalyst 40 reaches the amount (E) for saturating the downstream catalyst 40 with oxygen, the fourth embodiment, which has been described above, judges that there is no more benefit of reducing the throttle-opening angle TA. However, the present invention is not limited to the use of such a judgment method. Alternatively, such a judgment may be formulated depending on whether the cumulative intake air amount provided after the start of fuel cut has reached a value for saturating both the upstream catalyst 38 and downstream catalyst 40 with oxygen.

According to the fourth embodiment, which has been described above, the process for restoring the throttle-opening angle TA to normal with appropriate timing and restoring the valve overlap to normal, which is performed when a fuel cut process is continued for a long period of time, is incorporated into the device according to the third embodiment. However, the present invention is not limited to such a configuration. The above process, which is peculiar to the fourth embodiment, may alternatively be incorporated into the device according to the first or second embodiment.

In the fourth embodiment, which has been described above, the "Increased EGR amount canceling means" according to the eighth aspect of the present invention is implemented when the ECU 50 performs step 166; and the "decreased amount canceling means" according to the eighth aspect of the present invention is implemented when the ECU 50 performs step 164.

Further, in the fourth embodiment, which has been described above, the "continuation time judgment means" according to the ninth aspect of the present invention is implemented when the ECU 50 performs step 160.

Furthermore, in the fourth embodiment, which has been described above, the "air amount cumulating means" according to the tenth aspect of the present invention is implemented when the ECU 50 executes the routine shown in FIG. 15; and the "judgment means" according to the tenth aspect of the present invention is implemented when the ECU 50 performs step 160.

Moreover, in the fourth embodiment, which has been described above, the "upstream oxygen storage capacity detection means" according to the eleventh aspect of the present invention is implemented when the ECU 50 performs steps 190 and 194; and the "setup means" according to the eleventh aspect of the present invention is implemented when the ECU 50 performs step 192.

Fifth Embodiment

Features of Fifth Embodiment

A fifth embodiment of the present invention will now be described with reference to FIGS. 18A to 18D and 19 to 23.

Figure 19:
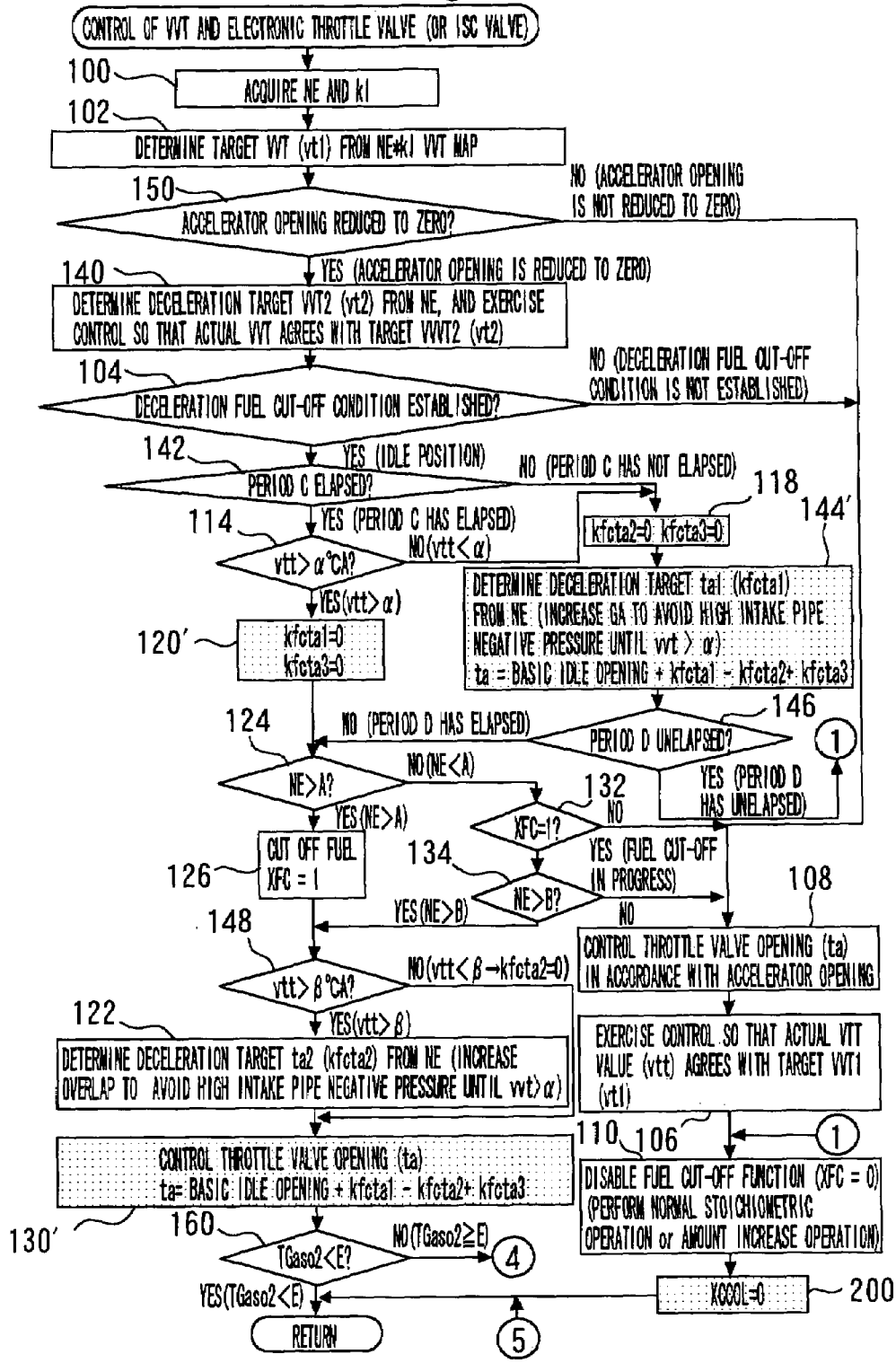
FIG. 19 is a flowchart (Part 1) illustrating a main routine that is executed by the fifth embodiment of the present invention.
Figure 20:
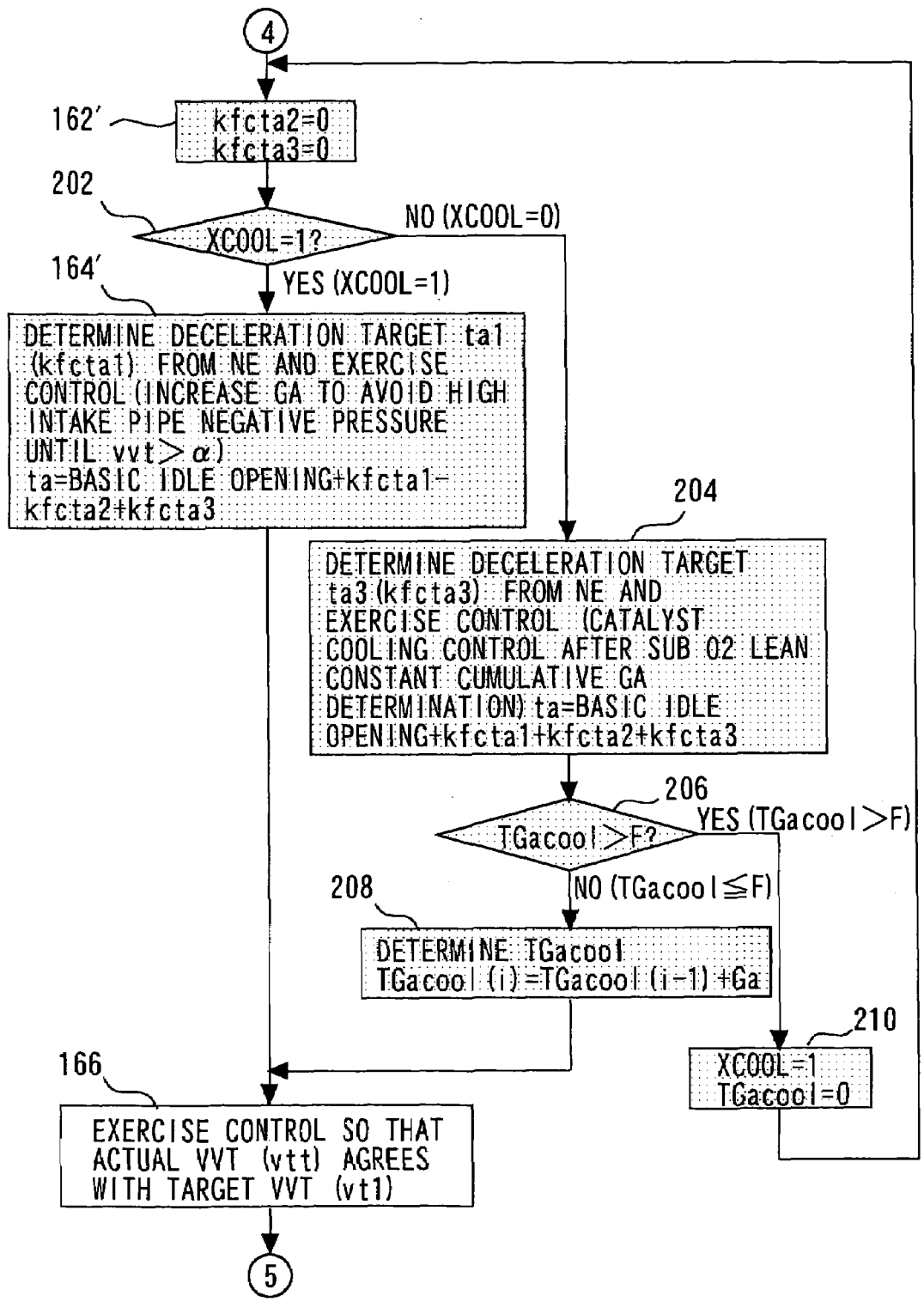
FIG. 20 is a flowchart (Part 2) illustrating the main routine that is executed by the fifth embodiment of the present invention.
Figures 21, 22:
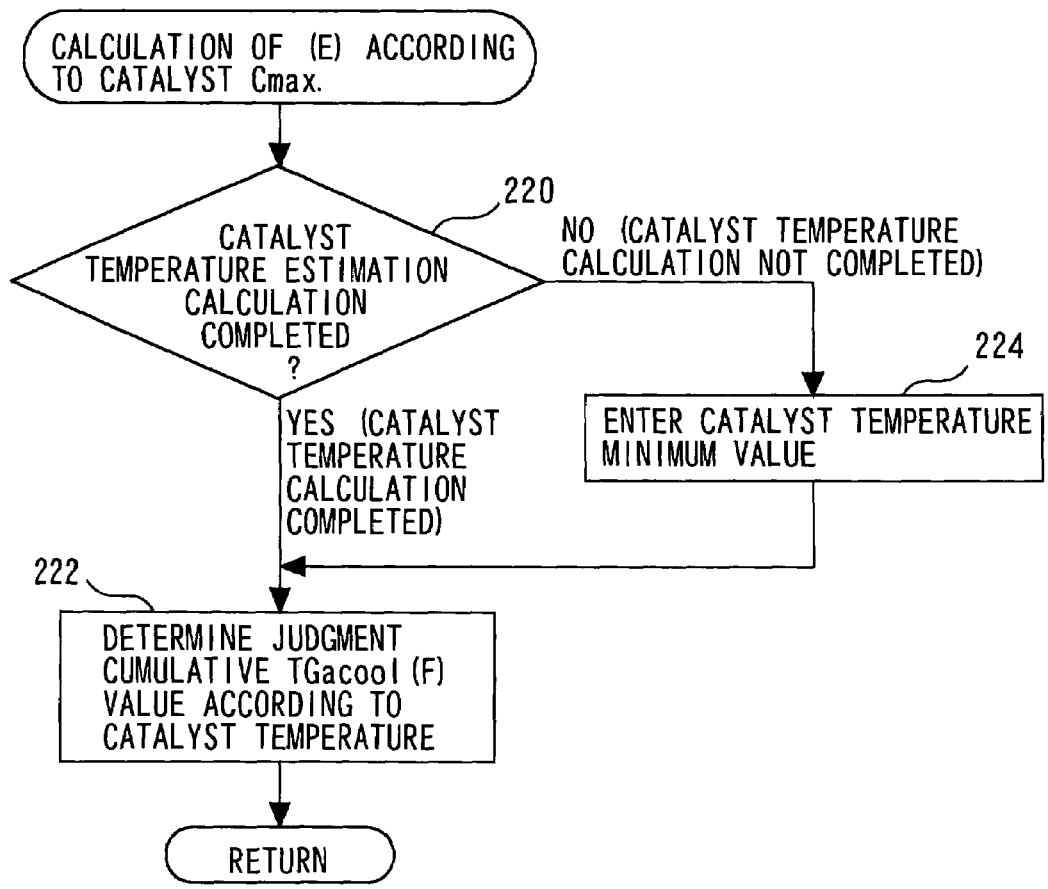
FIG. 21 is a map illustrating a third correction coefficient kfcta3, which is referenced by the routine shown in FIG. 20.
FIG. 22 is a flowchart illustrating a routine that is executed to calculate a cooling judgment value F in accordance with the fifth embodiment of the present invention.

The system according to the fifth embodiment can be implemented by adopting the hardware configuration shown in FIG. 1 and allowing the ECU 50 to execute a routine that is shown in FIGS. 19, 20, and 22.

Figure 18A:
FIGS. 18A to 18D are timing diagrams that illustrate the operations performed by a fifth embodiment of the present invention.
Figure 18B:
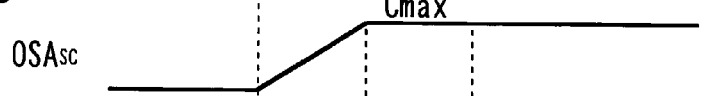
Figure 18C:
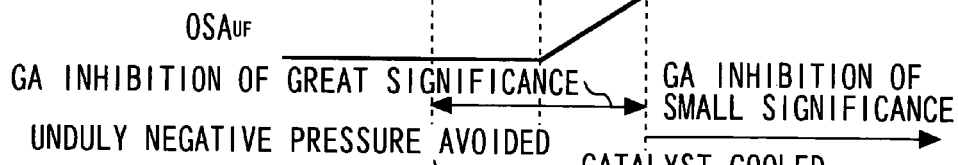
Figure 18D:
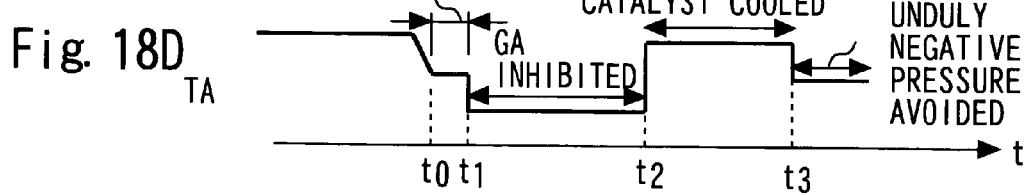

FIGS. 18A to 18D are timing diagrams that outline the operations performed by the system according to the present embodiment. More specifically, FIG. 18A shows a waveform that illustrates a state in which the fuel cut function is executed. FIG. 18B shows a waveform that indicates the oxygen storage amount $OSA_{SC}$ of the upstream catalyst 38. FIG. 18C shows a waveform that indicates the oxygen storage amount $OSA_{UF}$ of the downstream catalyst 40. FIG. 18D shows a waveform of the throttle-opening angle TA that prevails during fuel cut.

As is the case with the system according to the fourth embodiment, the system according to the present embodiment restores the throttle-opening angle TA to normal when it is estimated after the start of fuel cut that the oxygen occluded by the downstream catalyst 40 reaches its saturation. In FIG. 18D, the waveform between time t0 and time t2 is for implementing the above function, that is, also provided by the fourth embodiment.

The system according to the present embodiment sets the throttle-opening angle TA to a third target throttle-opening angle TA3, which is larger than the first target throttle-opening angle TA1, when the throttle-opening angle TA is restored to normal at time t2, and later sets the throttle-opening angle TA to the first target throttle-opening angle TA1 with appropriate timing (at time t3 in FIGS. 18A to 18D).

At time t2, the oxygen occluded by the upstream catalyst 38 and downstream catalyst 40 has reached its saturation. After time t2, therefore, there is no benefit of reducing the rate of air flow to the catalysts. Meanwhile, if the air amount is increased, the cooling of the upstream catalyst 38 and downstream catalyst 40 can be promoted. The catalysts progressively deteriorate when a large amount of supplied oxygen is received in a high-temperature environment. In other words, if the catalyst temperature is low, the progress of catalyst deterioration can be inhibited even when a large amount of oxygen is supplied. Therefore, if a large amount of air is distributed at time t2 to promote the cooling of the upstream catalyst 38 and downstream catalyst 40, it is possible to create a favorable situation for inhibiting the deterioration of the catalysts.

From the viewpoint described above, the system according to the present embodiment sets the throttle-opening angle TA to the third target throttle-opening angle TA3, which is larger than the first target throttle-opening angle TA1, when the downstream catalyst 40 is saturated with oxygen as indicated in FIG. 18D. Since throttle control is exercised as described above, the system according to the present embodiment inhibits the deterioration of the upstream catalyst 38 and downstream catalyst 40 to a greater extent than the system according to the fourth embodiment.

Details of Process Performed by Fifth Embodiment

FIGS. 19 and 20 are flowcharts illustrating a main routine that the ECU 50 executes to implement the above functionality in accordance with the present embodiment. The routine shown in FIGS. 19 and 20 is similar to the routine shown in FIG. 14 except that steps 118, 120, 130, 144, 162, and 164 are replaced by steps 118', 120', 130', 144', 162', and 164', respectively, and that steps 200 to 208 are added (the added steps are shaded). As regards the steps in FIGS. 19 and 20 that are the same as the steps in FIG. 14, their description is omitted or abridged with the same reference numerals assigned.

In the present embodiment, the target value for the throttle-opening angle TA, that is, the target ta, is calculated from the equation below:

Target $ta$=basic idle-opening angle $TA0$+first correction coefficient $kfcta1$−second correction coefficient $kfcta2$+third correction coefficient $kfcta3$     (2)

The third correction coefficient kfcta3 is a coefficient for enlarging the throttle-opening angle TA for correction purposes when the downstream catalyst 40 is saturated with oxygen.

Steps 118', 120', 130', 144', 162', and 164' are changed for form's sake from steps 118, 120, 130, 144, 162, and 164, respectively, in line with a change in the calculation formula for the target ta from Equation (1) to Equation (2). More specifically, steps 118', 120', and 162' are such that a process for setting the third correction coefficient kfcta3 to 0 is added to the processes performed in steps 118, 120, and 162. Steps 130', 144', and 164' are performed to calculate the target ta from Equation (2) in a situation where the third correction coefficient kfcta3 is set to 0.

In other words, the processes performed in steps 118', 120', 130', 144', 162', and 164' are substantially the same as those performed in steps 118, 120, 130, 144, 162, and 164. Therefore, the routine shown in FIGS. 19 and 20 is substantially similar to the routine shown in FIG. 14 except that the processes performed in steps 200 to 210 are added. The routine shown in FIGS. 19 and 20 will now be described mainly with reference to steps 200 to 210, which are peculiar to the present embodiment.

In the routine shown in FIGS. 19 and 20, step 200 is performed subsequently to step 110 in order to set a cooling flag XCOOL to 0 when the fuel cut function is to be disabled. The cooling flag XCOOL is used to indicate that the upstream catalyst 38 and downstream catalyst 40 are sufficiently cooled. While the fuel cut function is disabled, the flag XCOOL is set to 0 because the catalyst temperature is usually high.

The routine shown in FIGS. 19 and 20 repeatedly performs the same processes as those in the routine shown in FIG. 14 except for the execution of step 200 while the fuel cut function is disabled and while the condition prescribed in step 160 is established subsequently to the start of fuel cut, that is, during the time interval between the instant at which fuel cut starts and the instant at which it is judged that the downstream catalyst 40 is saturated with oxygen. In short, the system according to the present embodiment performs the same operation during the above-mentioned period as the system according to the fourth embodiment.

If the judgment result obtained in step 160 does not indicate that TGaso2<E, that is, if it is estimated that the downstream catalyst 40 is saturated with oxygen, the routine according to the present embodiment performs step 162' to set both the kfcta2 and kfcta3 values to 0 and then performs step 202 to judge whether the cooling flag XCOOL is set to 1.

Immediately after it is found for the first time that the condition prescribed in step 160 is not established, the cooling flag XCOOL is set to 0. Therefore, the condition prescribed in step 202 is not established. In this instance, the map shown in FIG. 21 is referenced to calculate the third correction coefficient kfcta3. Next, step 204 is performed to control the throttle-opening angle TA so as to achieve the target ta (third target throttle-opening angle TA3), which is obtained by substituting the third correction coefficient kfcta3 into Equation (2).

FIG. 21 shows a typical map that the ECU 50 stores to calculate the third correction coefficient kfcta3. According to this map, the setting for the third correction coefficient kfcta3 increases with an increase in the engine speed NE. When the engine speed NE is close to the idle rotation speed, the third correction coefficient kfcta3 is set to a minimum of 0. Further, this map makes it possible to set a third correction coefficient kfcta3 that is sufficiently greater than the first correction coefficient kfcta1 except during idling. Therefore, the process performed in step 204 can create a situation where an intake air amount Ga that is sufficiently larger than the intake air amount Ga for avoiding an oil rising (oil descent) can be distributed.

When step 204 is completed within a series of processes shown in FIG. 20, step 206 is performed to judge whether a cooling judgment value F is reached by a cooling air cumulative amount TGacool. The cooling air cumulative amount TGacool is the cumulative value of the intake air amount Ga that is distributed after the start of step 204, that is, after the throttle-opening angle TA is enlarged to the third target throttle-opening angle TA3. Meanwhile, the cooling judgment value F is a preselected air amount that is required for sufficiently cooling the upstream catalyst 38 and downstream catalyst 40 (the method for setting the cooling judgment value F will be described later in detail). Therefore, the process performed in step 206 substantially makes it possible to judge whether the upstream catalyst 38 and downstream catalyst 40 are sufficiently cooled to the extent that their deterioration can be inhibited.

If the obtained judgment result does not indicate that TGacool>F, it can be concluded that the upstream catalyst 38 and downstream catalyst 40 are still not sufficiently cooled. In this instance, step 208 is performed to update the cooling air cumulative amount TGacool, and then step 166 is performed to exercise control so that the actual valve timing vtt agrees with the normal target value vt1. In step 208, the latest cumulative amount TGacool(i) is calculated by adding the intake air amount Ga generated during the execution cycle of the routine to the TGacool(i−1) value prevailing in the previous processing cycle.

As far as fuel cut continues and before the cooling air cumulative amount TGacool reaches the cooling judgment value F, steps 202 to 208 and step 166 are repeatedly performed each time the routine is started. When this process is performed, a large amount of air can be distributed with the valve timing VVT restored to the normal setting during the time interval between the instant at which it is estimated that the downstream catalyst 40 is saturated with oxygen and the instant at which it is judged that the upstream catalyst 38 and downstream catalyst 40 are sufficiently cooled. Therefore, the system according to the present embodiment can effectively cool the upstream catalyst 38 and downstream catalyst 40 to effectively prevent them from deteriorating progressively during fuel cut.

When fuel cut continues until the cooling air cumulative amount TGacool reaches the cooling judgment value F, it is judged on the spot (refer to t3 in FIGS. 18A to 18D) that the condition prescribed in step 206 is established. In this instance, the cooling flag XCOOL is set to 1 subsequently to step 206, and the cooling air cumulative amount TGacool is reset to 0 (step 210). Subsequently, steps 162' and beyond are performed again to continue with the current processing cycle. More specifically, the third correction coefficient kfcta3 is reset to 0 in step 162', and then it is judged again that XCOOL=1.

Since it is judged that XCOOL=1, step 164' is then performed. More specifically, the first correction coefficient kfcta1, which is calculated from the map shown in FIG. 7, and the second and third correction coefficients kfcta2, kfcta3 are substituted into Equation (2) to calculate the first target throttle-opening angle TA1. In addition, control is exercised to ensure that the throttle-opening angle TA coincides with the first target throttle-opening angle TA1. Next, step 166 is performed to ensure that the actual valve timing vtt agrees with the normal target value vt1. The current processing cycle then comes to an end.

When the routine is started subsequently, steps 164' and 166 are repeatedly performed as far as fuel cut continues. As a result, the normal setting for the valve timing VVT is employed. Further, fuel cut continues (refer to a period beyond time t3 in FIGS. 18A to 18D) while the throttle-opening angle TA is reduced to the smallest opening for avoiding an oil rising (oil descent).

If the above state is created before the end of fuel cut, it is possible to promptly revert to the normal operating state simply by resuming the fuel injection from the fuel injection valve 26. Therefore, the system according to the present embodiment can properly assure the stability of the internal combustion engine 10 upon recovery from fuel cut as is the case with the system according to the fourth embodiment.

FIG. 22 is a flowchart illustrating a routine that the ECU 50 executes to set the cooling judgment value F, which is used in step 206. In the routine shown in FIG. 22, step 220 is performed first to judge whether a calculation for catalyst temperature estimation is completed. The ECU 50 can estimate the catalyst temperature in accordance, for instance, with the operating state of the internal combustion engine 10. Step 220 is performed to judge whether the calculation for catalyst temperature estimation is completed.

If the obtained judgment result indicates that catalyst temperature estimation is completed, step 222 is performed to calculate the cooling judgment value F in accordance with the result of estimation. The cooling judgment value F denotes an air flow rate that is required for sufficient cooling of the upstream catalyst 38 and downstream catalyst 40. Therefore, it is demanded that the cooling judgment value F increase with an increase in the catalyst temperature.

Figure 23:
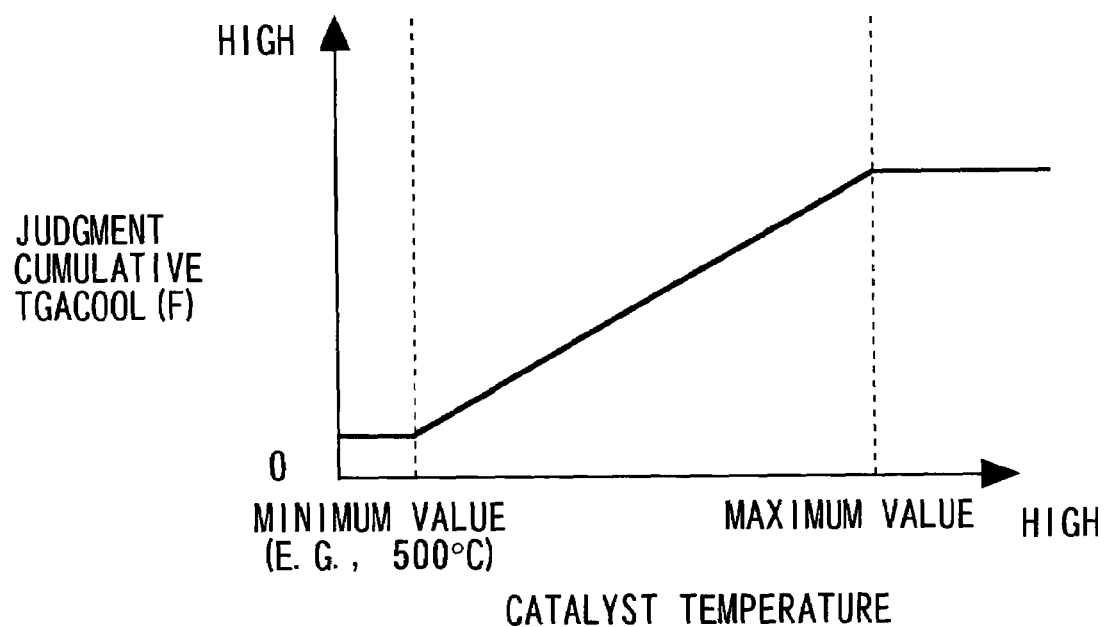
FIG. 23 is a map illustrating the cooling judgment value F that is referenced by the routine shown in FIG. 22.

FIG. 23 is a typical map illustrating the cooling judgment value F that the present embodiment uses from the viewpoint described above. In step 222, the ECU 50 references this map to set the cooling judgment value F. This process meets the above demand because it can set the cooling judgment value F that increases with an increase in the catalyst temperature.

Catalyst temperature estimation may not be completed when the process performed in step 220 is called for. If catalyst temperature estimation is not completed, step 224 is performed to select the lowest possible catalyst temperature (e.g., 500° C.). Step 222 is then performed in accordance with the selected lowest possible catalyst temperature. When the lowest catalyst temperature is used as the basis, the cooling judgment value F is set to the minimum value. When this process is performed, the cooling judgment value F is set to an unduly great value because catalyst temperature estimation is incomplete. As a result, it is possible to properly prevent the upstream catalyst 38 and downstream catalyst 40 from being excessively cooled.

When the judgment result obtained in step 160 does not indicate that TGaso2<E, the fifth embodiment, which has been described above, adjusts the throttle-opening angle TA for cooling purposes, that is, sets the throttle-opening angle TA to the third target throttle-opening angle TA3. However, the present invention is not limited to the use of such a throttle opening adjustment method. The throttle-opening angle TA may alternatively be changed to the third target throttle-opening angle TA3 simply when the fuel is continuously cut off for a predetermined period of time.

According to the fifth embodiment, which has been described above, the process for cooling the catalysts at a stage where the oxygen occluded by the downstream catalyst 40 has reached its saturation is incorporated into the device according to the fourth embodiment. However, the present invention is not limited to such a configuration. The above process, which is peculiar to the fifth embodiment, may alternatively be incorporated into the device according to the first, second, or third embodiment.

In the fifth embodiment, which has been described above, the "cooling purpose flow amount achievement means" according to the twelfth aspect of the present invention is implemented when the ECU 50 performs step 204; and the "flow amount change means" according to the twelfth aspect of the present invention is implemented when the ECU 50 performs step 164'.

Further, in the fifth embodiment, which has been described above, the "catalyst temperature detection/estimation means" according to the thirteenth aspect of the present invention is implemented when the ECU 50 performs step 220 or 224; and the "cooling time setup means" according to the thirteenth aspect of the present invention is implemented when the ECU 50 performs step 222.

Sixth Embodiment

Features of Sixth Embodiment

A sixth embodiment of the present invention will now be described with reference to FIGS. 24 to 27.

Figure 24:
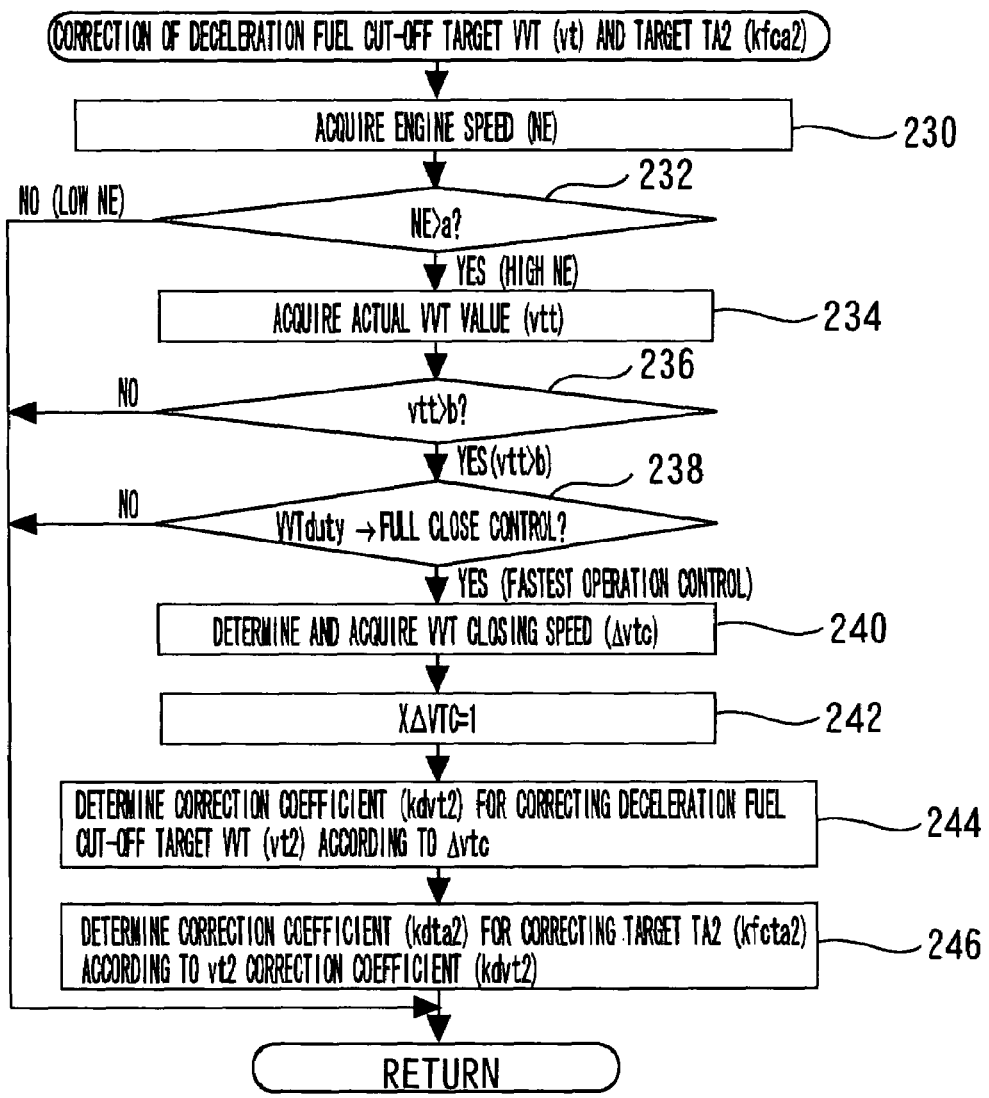
FIG. 24 is a flowchart illustrating a routine that is executed to calculate a correction coefficient in accordance with a sixth embodiment of the present invention.
Figure 27:
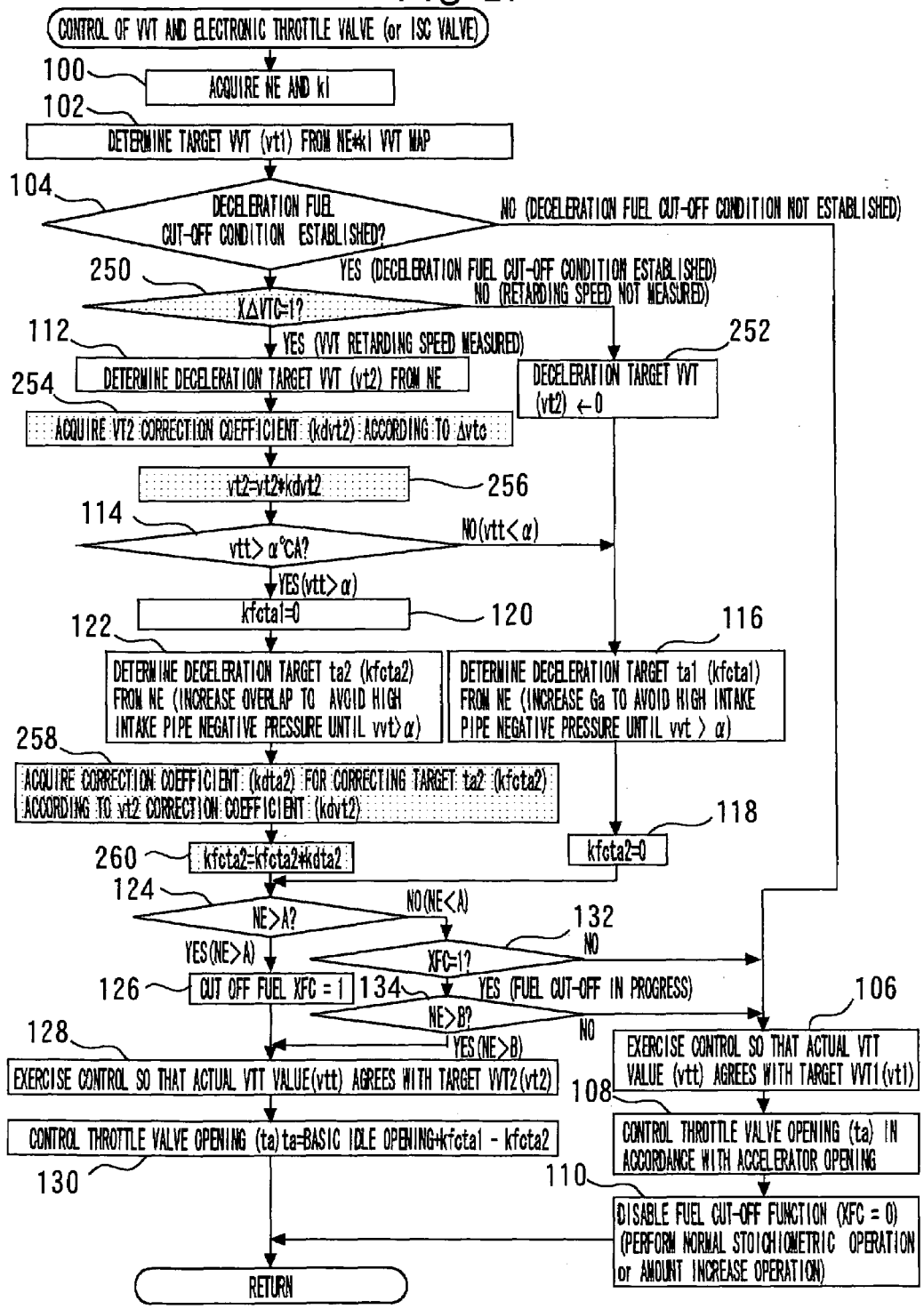
FIG. 27 is a flowchart illustrating a main routine that is executed by the sixth embodiment of the present invention.

The system according to the sixth embodiment can be implemented by adopting the hardware configuration shown in FIG. 1 and allowing the ECU 50 to execute a routine that is shown in FIGS. 24 and 27.

The system according to the present embodiment is similar to those according to the first to fifth embodiments in that the valve timing VVT is changed to increase the valve overlap, that is, increase the internal EGR amount, during fuel cut. It is assumed for the sake of explanation that the variable valve mechanism 32 advances the valve opening timing of the intake valve 28 in order to increase the valve overlap.

To keep the internal combustion engine stable upon recovery from fuel cut in a situation where the variable valve mechanism 32 operates in advancing direction during fuel cut, it is necessary to stop the advancing operation of the variable valve mechanism 32 upon recovery from fuel cut and properly reduce the internal EGR amount. If, in this instance, the advancing state persists due to poor response of the variable valve mechanism 34, the internal combustion engine operation remains unstable until the advancing operation is terminated.

To avoid the above problem, the system according to the present embodiment detects the operating speed of the variable valve mechanism 32, more specifically, the operating speed at which the variable valve mechanism 32 operates in retarding direction, before driving the variable valve mechanism 32 in advancing direction. Further, the system according to the present embodiment sets the advancing amount of the variable valve mechanism 32 for a fuel cut period in accordance with the operating speed that is detected as described above. In other words, the advancing amount setting for the fuel cut period increases with an increase in the operating speed of the variable valve mechanism 32 and decreases with a decrease in the operating speed. When setup is performed as described above, a situation where the internal combustion engine can steadily operate can be created promptly and constantly by clearing the advancing amount of the variable valve mechanism 32 at the time of recovery from fuel cut without regard to the operating speed of the variable valve mechanism 32.

Details of Process Performed by Sixth Embodiment

FIG. 24 is a flowchart illustrating a first routine that the ECU 50 executes to implement the above functionality. More specifically, this routine detects an operating speed at which the variable valve mechanism 32 operates in retarding direction, and calculates a correction coefficient kdvt2 for the valve timing VVT and a correction coefficient kfcta2 for the throttle opening in accordance with the detected operating speed.

In the routine shown in FIG. 24, step 230 is performed first to acquire the engine speed NE. Next, step 232 is performed to judge whether the engine speed NE is higher than a judgment rotation speed a. The variable valve mechanism 32 is driven by the hydraulic pressure of the internal combustion engine. Therefore, the operating speed of the variable valve mechanism 32 varies with the engine speed NE.

In the system according to the present embodiment, it is demanded that the variable valve mechanism 32 advance to a greater extent during fuel cut in a high rotation speed region than during fuel cut in a low rotation speed region. Therefore, when a study is to be conducted to determine whether the variable valve mechanism 32 can revert to a proper state at the time of recovery from fuel cut, it is appropriate that the operating speed at which the variable valve mechanism 32 operates in a high rotation speed region be determined.

The judgment rotation speed a, which is used in step 232, is a value that is used to judge whether the internal combustion engine is operating in a high rotation speed region (e.g., at a speed of 300 rpm or higher). Therefore, if it is judged that the internal combustion engine is not operating in the high rotation speed region, it is concluded that the current operating state is not appropriate for detecting the operating speed of the variable valve mechanism 34. Consequently, the current process comes to an immediate end.

If, on the other hand, the judgment result obtained in step 232 indicates that NE>a, it can be concluded that the condition for detecting the operating speed of the variable valve mechanism 32 is established as far as the engine speed NE is concerned. In this instance, step 234 is performed first to acquire the actual valve timing vtt, and then step 236 is performed to judge whether the acquired vtt value is greater than a judgment value b.

For accurate detection of the operating speed of the variable valve mechanism 32, it is necessary that the variable valve mechanism 32 be operated to a great extent. In other words, when the retarding direction operating speed of the variable valve mechanism 32 is to be detected, it is prerequisite that the variable valve mechanism 32 be more or less displaced in advancing direction.

If the judgment result obtained in step 236 does not indicate that vtt>b, it is concluded that the prerequisite is not met. In this instance, the current process comes to an immediate end. If, on the other hand, the obtained judgment result indicates that vtt>b, it can be concluded that the condition for detecting the operating speed is met as far as the advancing amount of the variable valve mechanism 32 is concerned. In this instance, step 238 is performed to judge whether full closing is requested for valve timing control purposes.

In a situation where the engine speed NE and throttle-opening angle TA are more or less adequate, the variable valve mechanism 32 is driven in advancing direction so that a certain amount of valve overlap is generated. Further, while the load imposed on the internal combustion engine is light, the variable valve mechanism 32 is driven so that the valve overlap vanishes. Therefore, if the throttle valve 18 closes during acceleration or high-speed run, the change from middle/heavy load to light load is recognized. Thus, the variable valve mechanism 32 is driven so that it switches from an advanced state to a non-advanced state. Further, when the throttle remains fully closed so that the fuel cut condition is established, the aforementioned fuel cut process starts after the above-mentioned changes.

As described above, when the change from middle/heavy load to light load is recognized, the system according to the present embodiment instructs the variable valve mechanism 32 to stop its advancing operation. When such an instruction is issued, the variable valve mechanism 32 operates in retarding direction at the highest speed to stop its advancing operation immediately. In this document, the control exercised to operate the variable valve mechanism 32 in retarding direction as described above is referred to as "full close control."

If, in the routine shown in FIG. 24, the judgment result obtained in step 238 does not indicate that full close control is requested, it can be concluded that the operating speed of the variable valve mechanism 32 should not be detected at the moment. In this instance, the current process comes to an immediate end. If, on the other hand, the obtained judgment result indicates that full close control is requested, step 240 is performed to acquire a closing speed Δvtc of the variable valve mechanism 32.

The closing speed Δvtc is the operating amount per unit time that arises in the variable valve mechanism 32 after full close control is started. In step 240, a sensor built in the variable valve mechanism 32 detects the operating position of the variable valve mechanism 32 at predetermined sampling intervals. The closing speed Δvtc is then calculated in accordance with the above sampling intervals and the amount of a change in the operating position.

When the above process terminates, a closing speed detection completion flag XΔVTC is set to 1 (step 242). Next, step 244 is performed to calculate a correction coefficient kdvt2 in accordance with the closing speed Δvtc.

Figure 25:
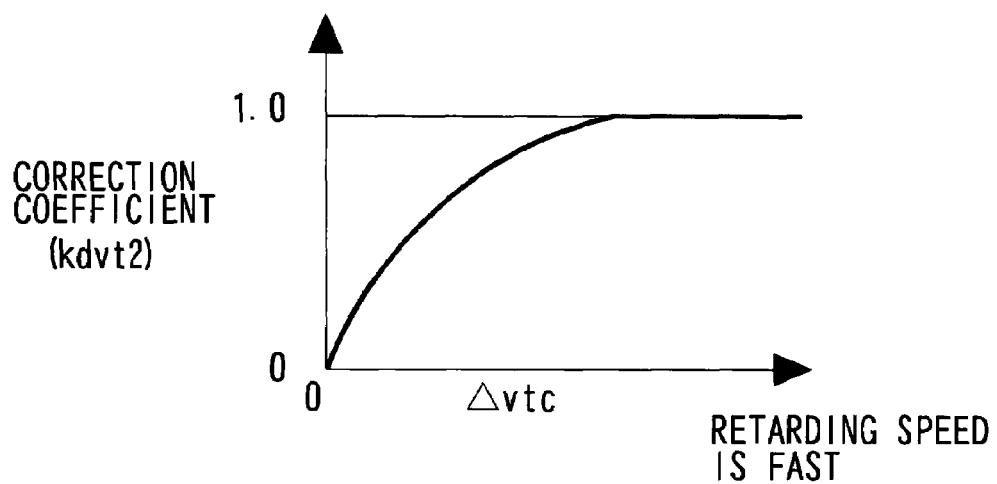
FIG. 25 is a map that is referenced by the routine shown in FIG. 24 to calculate a correction coefficient kdvt2.

The correction coefficient kdvt2 is a coefficient for correcting the deceleration target value vt2 for the valve timing VVT. FIG. 25 shows a typical map that the ECU 50 stores to calculate the correction coefficient kdvt2. According to this map, the correction coefficient kdvt2 is set as a function for the closing speed Δvtc. More specifically, the setting for the correction coefficient kdvt2 comes closer to a minimum value of 0 with a decrease in the closing speed Δvtc and comes closer to a maximum value of 1.0 with an increase in the closing speed Δvtc. The method for correcting the target value vt2 with the correction coefficient kdvt2 and the physical meaning of the resulting target value vt2 will be described in detail later with reference to FIG. 27.

In the routine shown in FIG. 24, step 246 is performed next to calculate a correction coefficient kdta2 in accordance with the correction coefficient kdvt2. The calculated correction coefficient kdta2 is a coefficient for correcting the second correction coefficient kfcta2, which determines the reduction amount to be given to the throttle-opening angle TA during a fuel cut period.

Figure 26:
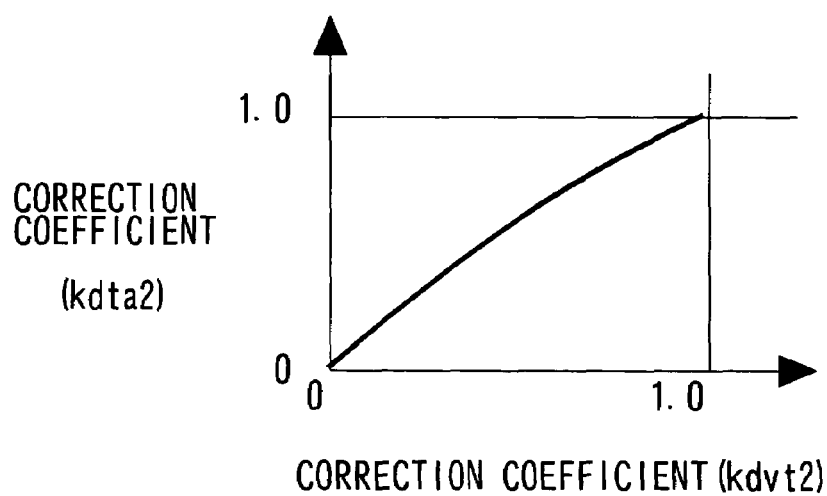
FIG. 26 is a map that is referenced by the routine shown in FIG. 24 to calculate a correction coefficient kdta2.

FIG. 26 shows a typical map that the ECU 50 stores to calculate the correction coefficient kdta2. According to this map, the correction coefficient kdta2 is set as a function for the correction coefficient kdvt2, which was set in step 244. More specifically, the correction coefficient kdta2 is set so that it is substantially proportional to the correction coefficient kdvt2. Therefore, the setting for the correction coefficient kdta2 comes closer to a minimum value of 0 with a decrease in the closing speed Δvtc of the variable valve mechanism 32 and comes closer to a maximum value of 1.0 with an increase in the closing speed Δvtc as is the case with the aforementioned correction coefficient kdvt2. The method for correcting the reduction amount (second correction coefficient kfcta2) for the throttle-opening angle TA with the correction coefficient kdta2 and the physical meaning of the resulting second correction coefficient kfcta2 will be described in detail later with reference to FIG. 27.

FIG. 27 is a flowchart illustrating a routine that the ECU 50 executes to control the variable valve mechanism 32 and throttle valve 18 in accordance with the present embodiment. This routine is substantially similar to the routine shown in FIG. 3 except that steps 250 to 260 are inserted into appropriate places. As regards the steps in FIG. 27 that are the same as the steps in FIG. 3, their description is omitted or abridged with the same reference numerals assigned.

If, in the routine shown in FIG. 27, the judgment result obtained in step 104 indicates that the fuel cut condition is established, step 250 is performed to judge whether the closing speed detection completion flag XΔVTC is set to 1. If the obtained judgment result does not indicate that XΔVTC=1, it can be concluded that the closing speed Δvtc of the variable valve mechanism 32 is not detected yet.

If the closing speed Δvtc is known, the system according to the present embodiment calculates the advancing amount that can be promptly vanished by the closing speed Δvtc, and sets the calculated value as the deceleration target VVT (vt2). However, if the closing speed Δvtc is unknown, such a target value vt2 cannot properly be set. Therefore, if the judgment result obtained in step 250 does not indicate that XΔVTC=1, the target VVT (vt2), that is, the advancing amount to be given to the variable valve mechanism 32 during a fuel cut period, is set to a minimum value of 0.

When the target VVT (vt2) is set to a minimum value of 0, no valve overlap occurs so that the internal EGR amount can be rendered small. If the throttle-opening angle TA is excessively decreased in this instance, the intake path pressure becomes unduly negative, thereby causing an oil rising or oil descent problem. Therefore, if step 252 is performed, steps 116 and 118 are subsequently performed to make a correction so that the throttle-opening angle TA becomes larger than the basic idle opening.

If, on the other hand, the judgment result obtained in step 250 indicates that the closing speed detection completion flag XΔVTC is set to 1, step 112 is performed first to calculate the deceleration target VVT (vt2) (the resulting calculated value is hereinafter referred to as the "vt2 reference value"). Next, step 254 is performed to acquire the correction coefficient kdvt2.

When step 112 is performed, the valve timing required for generating an adequate EGR amount during fuel cut (the advancing amount of the variable valve mechanism 32 in the present embodiment) is calculated as the value vt2 in accordance with the map shown in FIG. 5, as is the case with the first embodiment. Further, when step 254 is performed, the correction coefficient kdvt2 calculated in step 244, which is shown in FIG. 24, is acquired.

In the routine shown in FIG. 27, the vt2 reference value and correction coefficient kdvt2 are substituted into the right side of the following equation to calculate the target VVT (vt2) for use in the current processing cycle (step 256):

$$vt2 = vt2 \times kdvt2 \tag{3}$$

As mentioned earlier, the correction coefficient kdvt2 comes closer to a maximum value of 1.0 with an increase in the closing speed Δvtc (see FIG. 25). According to Equation (3), therefore, the setting for the target VVT (vt2) comes closer to the vt2 reference value with an increase in the closing speed Δvtc and comes closer to a minimum value of 0 with a decrease in the closing speed Δvtc.

In the routine shown in FIG. 27, step 128 is performed later to control the variable valve mechanism 32 so that the actual VVT agrees with the target VVT (vt2). As a result, the advancing amount given to the variable valve mechanism 32 during fuel cut increases with an increase in the closing speed Δvtc and decreases with a decrease in the closing speed Δvtc. Therefore, no matter what closing speed is exhibited by the variable valve mechanism 32, the system according to the present embodiment can promptly stop the advancing operation of the variable valve mechanism upon each recovery from fuel cut and create a situation where the internal combustion engine can steadily operate.

In the routine shown in FIG. 27, step 258 is performed to acquire the correction coefficient kdta2 that was calculated in step 246, which is shown in FIG. 24, after the second correction coefficient kfcta2 is calculated in step 122 (the calculated value is hereinafter referred to as the "kfcta2 reference value"). Next, the reference value for the second correction coefficient kfcta2 and the correction coefficient kdta2 are substituted into the right side of the following equation to calculate the second correction coefficient kfcta2 for use in the current processing cycle (step 260).

$$kfcta2 = kfcta2 \times kdta2 \tag{4}$$

As mentioned earlier, the correction coefficient kdta2 is substantially proportional to the correction coefficient kdvt2 (see FIG. 26). According to Equation (4), therefore, the second correction coefficient kfcta2 comes closer to the reference value as the correction coefficient kdvt2 comes closer to the value 1.0, and comes closer to a minimum value of 0 as the correction coefficient kdvt2 comes closer to a minimum value of 0. In other words, the setting for the second correction coefficient kfcta2 comes closer to a maximum value of 1.0 as the closing speed Δvtc increases with the setting for the advancing amount vt2 increased, and comes closer to a minimum value of 0 as the closing speed Δvtc decreases with the advancing amount vt2 decreased.

In the routine shown in FIG. 27, step 130 is performed later to calculate the target ta and control the throttle-opening angle TA. The target ta is calculated from Equation (1), that is, the computing equation "target ta=basic idle-opening angle TA0+first correction coefficient kfcta1−second correction coefficient kfcta2." When step 260 is performed, the first correction coefficient kfcta1 is set to 0 (see step 120). In this instance, the target ta is obtained by subtracting the second correction coefficient kfcta2 from the basic idle-opening angle TA0. In other words, the target ta becomes considerably smaller than the basic idle-opening angle TA0 as the setting for the advancing amount vt2 for a fuel cut period increases, and becomes closer to the basic idle-opening angle TA0 as the setting for the advancing amount vt2 decreases.

When the advancing amount vt2 is great, it is possible to sufficiently inhibit an oil rising and oil descent because the intake pressure does not become unduly negative even if the target ta is considerably decreased. Even when the obtained advancing amount vt2 is inadequate, it is possible to avoid an oil rising and oil descent by decreasing the target ta. According to the above setting for the target ta, it is possible to create the above situations in accordance with the value of the advancing amount vt2. Therefore, the system according to the present embodiment can avoid an oil rising and oil descent and protect the catalysts as is the case with the system according to the first, second, third, fourth, of fifth embodiment while adjusting the advancing amount vt2 in accordance with the operating speed of the variable valve mechanism 32.

It is assumed for the sake of explanation that the sixth embodiment, which has been described above, generates a valve overlap by advancing the intake side variable valve mechanism 32, and determines the advancing amount in accordance with the operating speed of the variable valve mechanism 32. However, the present invention is not limited to the use of such a method. The valve overlap may alternatively be generated by retarding the exhaust side variable valve mechanism 34. When such an alternative method is adopted, the advantages offered by the sixth embodiment can be provided by determining the advancing amount in accordance with the operating speed of the variable valve mechanism 34.

Further, in the sixth embodiment, which has been described above, only the variable valve mechanism 32 (or 34) invokes EGR during fuel cut. However, the mechanism for invoking EGR is not limited to the variable valve mechanism 32 (or 34). Alternatively, an external EGR mechanism including an EGR valve and the like may invoke EGR during fuel cut. When such an alternative method is adopted, the advantages offered by the sixth embodiment can be provided by determining the EGR valve operating amount for a fuel cut period in accordance with the operating speed of the EGR valve.

Furthermore, the sixth embodiment, which has been described above, does not measure the closing speed Δvtc of the variable valve mechanism 32 until full close control (see step 238) is exercised. However, the present invention is not limited to the use of such a method. An alternative is to forcibly exercise full close control when the measurement of the closing speed Δvtc is requested.

In the sixth embodiment, which has been described above, the variable valve mechanism 32 corresponds to the "EGR adjustment mechanism" according to the fourteenth aspect of the present invention; the "operating speed detection means" according to the fourteenth aspect of the present invention is implemented when the ECU 50 performs step 240; and the "operating amount setup means" according to the fourteenth aspect of the present invention is implemented when the ECU 50 performs steps 244, 254, and 256.

Further, in the sixth embodiment, which has been described above, the "reduction amount setup means" according to the fifteenth aspect of the present invention is implemented when the ECU 50 performs steps 246, 258, and 260.

Seventh Embodiment

Features of Seventh Embodiment

A seventh embodiment of the present invention will now be described with reference to FIGS. 28 and 29.

The system according to the seventh embodiment can be implemented by allowing the ECU 50 in the system according to the above-described sixth embodiment to execute a below-described routine shown in FIG. 28 instead of the routine shown in FIG. 24.

When the engine speed NE is higher than the judgment rotation speed a, the system according to the above-described sixth embodiment allows the closing speed Δvtc of the variable valve mechanism 32 to be measured (see step 230). However, when such a method is employed, the closing speed Δvtc cannot be measured as far as the internal combustion engine operates in a low rotation speed region. As a result, the advancing amount vt2 to be provided during fuel cut cannot properly be set.

Meanwhile, the variable valve mechanism 32 is hydraulically driven. Therefore, there is a remarkable correlation between the closing speed Δvtc of the variable valve mechanism 32 and the engine speed NE. If such a correlation is known, the closing speed Δvtc0 measured at an arbitrary engine speed NE can be converted to a closing speed Δvtc in a high rotation speed region. If such conversion is used to estimate the closing speed Δvtc, the closing speed Δvtc in a high rotation speed region can be acquired without waiting for the internal combustion engine to reach the high rotation speed region. Under such circumstances, the system according to the present embodiment uses the above method to estimate the closing speed Δvtc immediately after internal combustion engine startup.

Details of Process Performed by Seventh Embodiment

Figure 28:
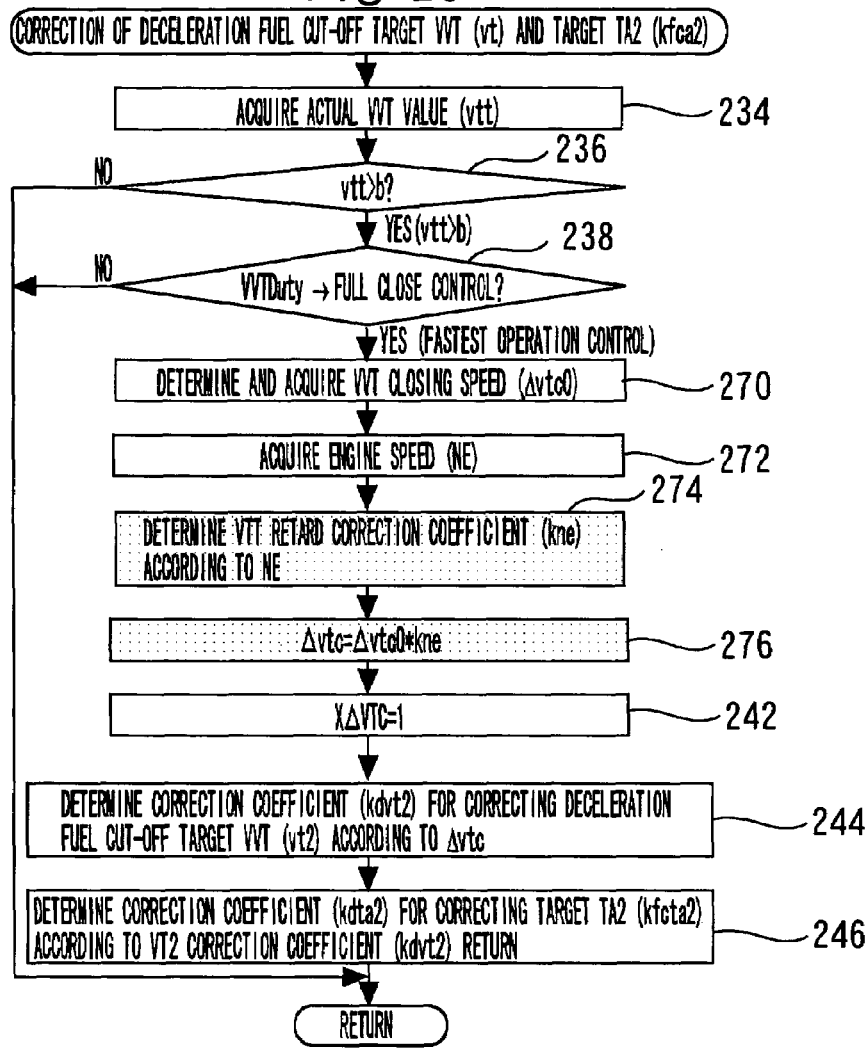
FIG. 28 is a flowchart illustrating a routine that is executed to calculate a correction coefficient in accordance with a seventh embodiment of the present invention.

FIG. 28 is a flowchart illustrating a routine that the ECU 50 executes to implement the above functionality. This routine is similar to the routine shown in FIG. 24 except that steps 230 and 232 are eliminated and that step 240 is replaced by steps 270 to 276. As regards the steps in FIG. 28 that are the same as the steps in FIG. 24, their description is omitted or abridged with the same reference numerals assigned.

In the routine shown in FIG. 28, no matter whether the engine speed NE is higher than the judgment rotation speed a, steps 234 to 238 are performed to sequentially judge whether an adequate advancing amount vtt is generated and whether full close control is requested. If the obtained judgment results indicate that the conditions are established, step 270 is immediately performed to measure the closing speed of the variable valve mechanism 32. The measured closing speed is hereinafter referred to as the "reference closing speed $\Delta vtc0$."

Next, step 272 is performed to acquire the current engine speed NE, that is, the engine speed NE prevailing when the reference closing speed $\Delta vtc0$ is measured. Next, step 274 is performed to calculate a VVT retard correction coefficient kne in accordance with the acquired engine speed NE. Subsequently, the reference closing speed $\Delta vtc0$ and VVT retard correction coefficient kne are substituted into the right side of the following equation to calculate the closing speed $\Delta vtc$ in a high rotation speed region (step 276):

$$\Delta vtc = \Delta vtc0 \times kne \tag{5}$$

Figure 29:
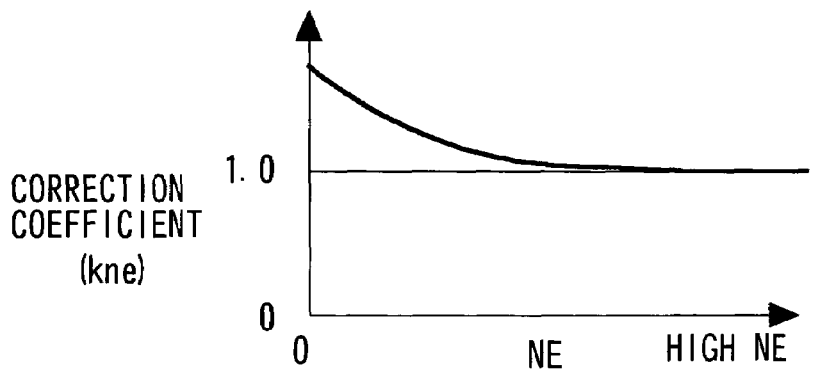
FIG. 29 is a map that is referenced by the routine shown in FIG. 28 to calculate a correction coefficient kne.

FIG. 29 is a map illustrating the correction coefficient kne, which is stored in the ECU 50. This map defines the correction coefficient kne as a function for the engine speed NE prevailing when the reference closing speed $\Delta vtc0$ is measured. More specifically, the defined correction coefficient kne increases with a decrease in the prevailing engine speed NE and converges to a minimum value of 1.0 with an increase in the prevailing engine speed NE.

In step 274, the correction coefficient kne is set in accordance with the map shown in FIG. 29. As a result, if the reference closing speed $\Delta vtc$ is measured in a low rotation speed region, the correction coefficient kne is set to a great value. If, on the other hand, the reference closing speed $\Delta vtc$ is measured in a high rotation speed region, the correction coefficient kne is set to a value close to 1.0. When these correction coefficients kne are used, the reference closing speed $\Delta vtc0$ can be properly converted to a closing speed $\Delta vtc$ in a high rotation speed region.

As described above, the routine shown in FIG. 28 can properly calculate the closing speed $\Delta vtc$ in a high rotation speed region without waiting for the engine speed NE to exceed the judgment rotation speed a. Therefore, the system according to the present embodiment can sufficiently shorten the time interval between the instant at which the internal combustion engine starts up and the instant at which a situation for properly setting the advancing amount vt2 for a fuel cut period is created.

In the seventh embodiment, which has been described above, the "operating speed measurement means" according to the seventeenth aspect of the present invention is implemented when the ECU 50 performs step 270; the "rotation speed storage means" according to the seventeenth aspect of the present invention is implemented when the ECU 50 performs step 272; and the "conversion means" according to the seventeenth aspect of the present invention is implemented when the ECU 50 performs steps 274 and 276.

Eighth Embodiment

Features of Eighth Embodiment

An eighth embodiment of the present invention will now be described with reference to FIGS. 30 and 31.

The system according to the eighth embodiment can be implemented by adding an oil temperature sensor for detecting the internal combustion engine oil temperature THO to the system according to the above-described sixth embodiment and by allowing the ECU 50 in the system according to the above-described sixth embodiment to execute a below-described routine shown in FIG. 30 instead of the routine shown in FIG. 24.

The system according to the above-described seventh embodiment considers the influence of the engine speed NE upon the closing speed $\Delta vtc$ and estimates the closing speed $\Delta vtc$ in a high rotation speed region by converting the reference closing speed $\Delta vtc0$, which is measured at an arbitrary engine speed NE, by the correction coefficient kne. It should be noted in this connection that the operating speed of the variable valve mechanism 32 is greatly influenced by the oil temperature as well as the engine speed NE.

In other words, the variable valve mechanism 32 is hydraulically driven. Therefore, there is a remarkable correlation between the variable valve mechanism 32 and hydraulic pressure. The hydraulic pressure of the internal combustion engine varies with the oil temperature no matter whether the engine speed NE remains unchanged. An internal part of the variable valve mechanism 32 receives supplied lubricating oil and slides. The friction of a lubricated part varies when the viscosity of the lubrication oil changes in accordance with oil temperature changes. For the reasons stated above, the closing speed $\Delta vtc$ of the variable valve mechanism 32 is greatly influenced by the oil temperature.

Under the above circumstances, the system according to the present embodiment calculates the closing speed $\Delta vtc$ of the variable valve mechanism 32 while considering not only the influence of the engine speed NE but also the influence of the oil temperature. The process performed to implement the above functionality will now be described in detail with reference to FIGS. 30 and 31.

Details of Process Performed by Eighth Embodiment

Figure 30:
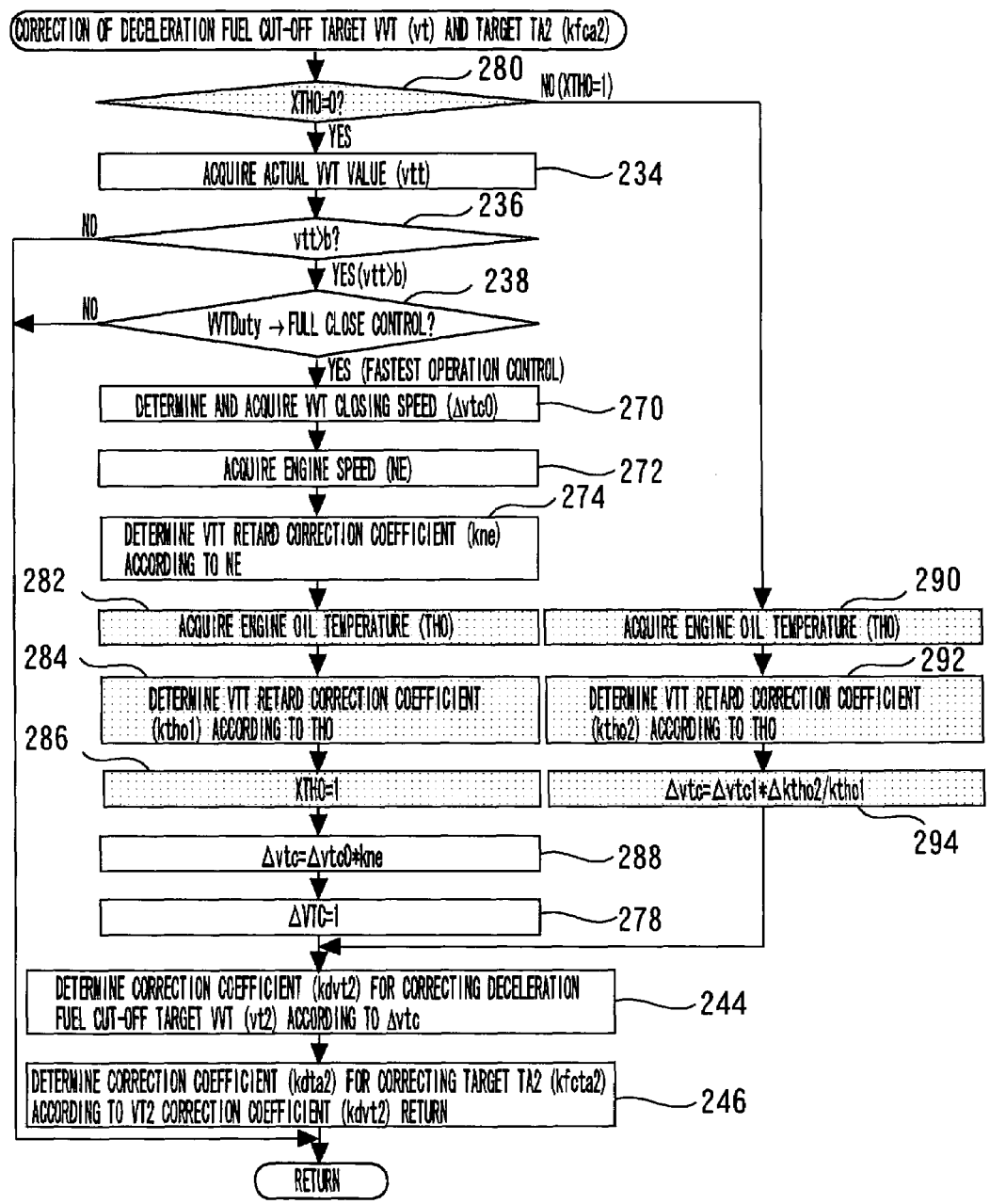
FIG. 30 is a flowchart illustrating a routine that is executed to calculate a correction coefficient in accordance with an eighth embodiment of the present invention.

FIG. 30 is a flowchart illustrating a routine that the ECU 50 executes to calculate the correction coefficient kdvt2 for correcting the advancing amount vt2 and the correction coefficient kdta2 for correcting the reduction amount of the throttle-opening angle TA in accordance with the present embodiment. This routine is similar to the routine shown in FIG. 28 except that steps 280 to 294 are inserted into appropriate places. As regards the steps in FIG. 30 that are the same as the steps in FIG. 28, their description is omitted or abridged with the same reference numerals assigned.

In the routine shown in FIG. 30, step 280 is performed first to judge whether an oil temperature detection completion flag XTHO is 0. When an initialization process is performed upon internal combustion engine startup, the oil temperature detection completion flag XTHO is set to 0. This flag is set to 1 when the reference closing speed $\Delta vtc0$ and oil temperature THO are both detected later. Immediately after internal combustion engine startup, it is judged that XTHO=0.

When it is recognized that XTHO=0, the processes for detecting the reference closing speed $\Delta vtc0$, acquiring the engine speed NE, calculating the correction coefficient kne, and the like are sequentially performed (steps 234 to 238 and steps 270 to 274). When these processes are terminated, step 282 is performed to acquire the oil temperature THO prevailing at the time of reference closing speed detection. Further, step 284 is performed to calculate a first VVT retard correction coefficient ktho1. The method for ktho1 calculation will be described in detail later.

When the above processes are completed, the oil temperature detection completion flag XTHO is set to 1 (step 286). Next, the reference closing speed $\Delta vtc0$ and VVT retard correction coefficient kne are substituted into the right side of the following equation to calculate the closing speed in a high rotation speed region on the basis of the current oil temperature THO (this closing speed is hereinafter referred to as the "first closing speed Δvtc1") (step 288):

$$\Delta vtc1 = \Delta vtc0 \times kne \quad (6)$$

When steps 278, 244, and 246 are subsequently completed, for instance, to perform the process for the flag XΔVTC and the process for setting the correction coefficients kdvt2, kdta2, the current routine terminates.

The routine shown in FIG. 30 is repeatedly started at predetermined execution intervals after internal combustion engine startup. When the routine is started after the first closing speed Δvtc1 is calculated, it is judged in step 280 that XTHO is not equal to 0. In this instance, step 290 is performed first to detect the prevailing oil temperature THO.

Next, step 292 is performed to calculate a second VVT retard correction coefficient ktho2 in accordance with the detected oil temperature THO. Subsequently, step 294 is performed to calculate the closing speed Δvtc from the following equation. Then, steps 244 and 246 are performed to calculate the correction coefficients kdvt2, kdta2 in accordance with the calculated closing speed Δvtc.

$$\Delta vtc = \Delta vtc1 \times ktho2/ktho1 \quad (7)$$

Figure 31:
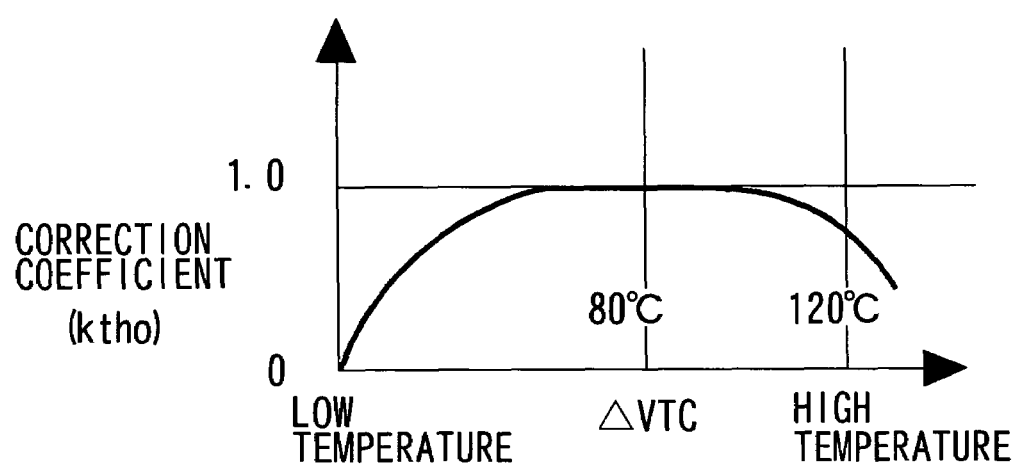
FIG. 31 is a map that is referenced by the routine shown in FIG. 30 to calculate first and second VVT retard angle correction coefficients ktho1, ktho2.

FIG. 31 shows a map that the ECU 50 stores to calculate the first and second VVT retard correction coefficients ktho1, ktho2. The map shown in FIG. 31 defines the relationship between the VVT retard correction coefficient ktho and oil temperature THO. In step 284, the ECU 50 accesses the map shown in FIG. 31, reads the correction coefficient ktho that corresponds to the oil temperature THO acquired in step 282, and regards the read value as the first VVT retard correction coefficient ktho1. In step 292, the ECU 50 accesses the map shown in FIG. 31, reads the correction coefficient ktho that corresponds to the oil temperature THO acquired in step 290, and regards the read value as the second VVT retard correction coefficient ktho2.

According to the map shown in FIG. 31, the setting for the correction coefficient ktho is close to a maximum value of 1.0 when the oil temperature THO is close to 80° C., and decreases when the oil temperature THO shifts from 80° C. to a higher or lower temperature. The hydraulic pressure, which is used to drive the variable valve mechanism 32, decreases when the lubricating oil viscosity decreases with an increase in the oil temperature. On the other hand, the friction of the variable valve mechanism 32 increases when the viscosity increases with a decrease in the oil temperature. Therefore, the operating speed of the variable valve mechanism 32, that is, the closing speed Δvtc, exhibits the same increase/decrease tendency relative to the oil temperature as the correction coefficient ktho shown in FIG. 31.

Therefore, "ktho2/ktho1" in the right side of Equation (7) is physically equivalent to the ratio between the operating speed prevailing at the time of the detection of the second VVT retard correction coefficient ktho2 and the operating speed prevailing at the time of the detection of the first VVT retard correction coefficient ktho1. According to Equation (7), therefore, the closing speed Δvtc prevailing at the time of the measurement of the second VVT retard correction coefficient ktho2 can be accurately calculated.

As described above, the routine shown in FIG. 30 can measure the first closing speed Δvtc1 at an arbitrary engine speed NE and at an arbitrary oil temperature, and correct the measured value Δvtc1 with the "ktho2/ktho1" ratio to accurately calculate the closing speed Δvtc prevailing at an arbitrary time. Therefore, the system according to the present embodiment can sufficiently reduce the time required for acquiring the closing speed Δvtc as is the case with the system according to the seventh embodiment, and provides higher accuracy in setting the advancing amount vt2 for a fuel cut period than the system according to the seventh embodiment.

The eighth embodiment, which has been described above, detects the oil temperature in order to consider the influence of the oil temperature upon the closing speed Δvtc. However, the correction to be made is not based on the oil temperature only. The same function can be implemented when, for instance, the cooling water temperature THW of the internal combustion engine is used instead of the oil temperature THO.

In the eighth embodiment, which has been described above, the "operating speed measurement means" according to the eighteenth aspect of the present invention is implemented when the ECU 50 performs step 270, which is shown in FIG. 30; the "oil temperature storage means" according to the eighteenth aspect of the present invention is implemented when the ECU 50 performs step 280; the "oil temperature detection means" according to the eighteenth aspect of the present invention is implemented when the ECU 50 performs step 292; and the "conversion means" according to the eighteenth aspect of the present invention is implemented when the ECU 50 performs step 294.

The invention claimed is:

1. A control device for an internal combustion engine, the control device comprising:
   fuel cut means for cutting off fuel when the internal combustion engine decelerates;
   EGR control means for providing a larger exhaust gas recirculation amount during fuel cut at a high engine speed than during fuel cut at a low engine speed; and
   intake air amount control means for providing a smaller intake air amount during fuel cut at a high engine speed than during fuel cut at a low engine speed.

2. The control device according to claim 1, further comprising:
   throttle opening angle electronic control means for electronically controlling a throttle opening angle in accordance with an accelerator opening angle,
   wherein the fuel cut means determines according to the accelerator opening angle whether the fuel cut execution condition is established.

3. The control device according to claim 1, wherein the intake air amount control means control the intake air amount by controlling the throttle opening angle or the idle speed control (ISC) valve flow rate.

4. The control device according to claim 1, further comprising:
   actual EGR judgment means for judging whether an actual value of the exhaust gas recirculation amount is greater than a judgment value,
   wherein the intake air amount control means includes control delay means, which waits until the actual value of the exhaust gas recirculation amount exceeds the judgment value after the start of fuel cut at a high engine speed, before beginning to exercise control so as to reduce the intake air amount.

5. The control device according to claim 4, further comprising:
   a variable valve mechanism that can vary a valve overlap period during which an intake valve open period overlaps with an exhaust valve open period,
   wherein the EGR control means includes VVT control means, which drives the variable valve mechanism to adjust an internal exhaust gas recirculation amount; and wherein the actual EGR judgment means determines according to the status of the variable valve mechanism whether the actual value of the exhaust gas recirculation amount is greater than the judgment value.

6. The control device according to claim 4, wherein the intake air amount control means includes means that maintains a larger intake air amount than at the beginning of fuel cut during the time interval between the instant at which fuel cut begins at a high engine speed and the instant at which the actual value of the exhaust gas recirculation amount exceeds the judgment value.

7. The control device according to claim 1, further comprising:
actual EGR judgment means for judging whether the actual value of the exhaust gas recirculation amount is greater than the judgment value; and
fuel cut function disable means for disabling a fuel cut function during the time interval between the instant at which a fuel cut execution condition is established and the instant at which the actual value of the exhaust gas recirculation amount exceeds the judgment value.

8. The control device according to claim 7, further comprising:
fuel cut function enable means for enabling the fuel cut function when a fuel cut function disable limit period elapses after fuel cut execution condition establishment.

9. The control device according to claim 1, wherein the EGR control means includes an EGR adjustment mechanism, which operates to change the exhaust gas recirculation amount; operating speed detection means, which detects an operating speed of the EGR adjustment mechanism; and operating amount setup means, which sets an operating amount of the EGR adjustment mechanism for a fuel cut period in accordance with the operating speed.

10. The control device according to claim 9, wherein the intake air amount control means includes reduction amount setup means, which ensures that a reduction amount for the intake air amount for a fuel cut period decreases with an increase in the operating amount.

11. The control device according to claim 9, wherein the EGR adjustment mechanism is driven by a hydraulic pressure exerted by the internal combustion engine; and wherein the operating speed detection means includes operating speed measurement means for measuring the operating speed of the EGR adjustment mechanism at an arbitrary oil temperature, oil temperature storage means for storing an oil temperature prevailing when the operating speed is measured; oil temperature detection means for detecting an oil temperature at a predefined time; and conversion means for converting the operating speed measured by the operating speed measurement means to an operating speed at the predefined time in accordance with the oil temperature prevailing when the operating speed is measured and the oil temperature prevailing at the predefined time.

12. The control device according to claim 9, wherein the operating speed detection means detects the operating speed of the EGR adjustment mechanism in a region where an engine speed exceeds a judgment value.

13. The control device according to claim 12, wherein the operating speed detection means includes operating speed measurement means, which measures the operating speed of the EGR adjustment mechanism at an arbitrary engine speed; rotation speed storage means, which stores the engine speed when the operating speed is measured; and conversion means, which, in accordance with the engine speed prevailing when the operating speed is measured, converts the operating speed measured by the operating speed measurement means to an operating speed within the region where an engine speed exceeds the judgment value.

14. The control device according to claim 1, further comprising:
increased EGR amount canceling means, which, when fuel cut has continued for a predetermined period of time, cancels the increased amount for correction purposes of the exhaust gas recirculation provided by the EGR control means; and
decreased amount canceling means, which, when fuel cut has continued for the predetermined period of time, cancels the decreased amount for correction purposes of the intake air provided by the intake air amount control means.

15. The control device according to claim 14, further comprising:
cooling purpose flow amount achievement means, which, when fuel cut has continued for the predetermined period of time, controls the intake air amount so as to invoke an intake air amount for cooling purposes, which is larger than the amount prevailing before the start of fuel cut; and
flow amount change means, which, when the intake air amount for cooling purposes has been maintained for a predetermined cooling period during fuel cut, exercises control so that the intake air amount is larger than the amount prevailing before the start of fuel cut and smaller than the amount for cooling purposes.

16. The control device according to claim 15, further comprising:
catalyst temperature detection/estimation means for detecting or estimating the temperature of a catalyst positioned in an exhaust path of the internal combustion engine; and
cooling time setup means for setting the cooling period in accordance with the temperature of the catalyst.

17. The control device according to claim 15, wherein the cooling purpose flow amount achievement means and the flow amount change means control the intake air amount by controlling a throttle opening angle or an idle speed control (ISC) valve flow rate.

18. The control device according to claim 14, further comprising:
continuation time judgment means, which, when it is estimated that a catalyst positioned in an exhaust path of the internal combustion engine fully occludes oxygen after the start of fuel cut, judges that fuel cut has continued for the predetermined period of time.

19. The control device according to claim 18, wherein the catalyst contains an upstream catalyst and a downstream catalyst, which are serially arranged, and includes a downstream oxygen sensor, which is positioned downstream of the upstream catalyst; and wherein the continuation time judgment means includes air amount cumulating means, which calculates a cumulative intake air amount that is reached since the downstream oxygen sensor begins to generate a lean output after the start of fuel cut, and judgment means, which, when the cumulative intake air amount reaches a value for causing the downstream catalyst to fully occlude oxygen, judges that fuel cut has continued for the predetermined period of time.

20. The control device according to claim 19, further comprising:

upstream oxygen storage capacity detection means for detecting the oxygen storage capacity of the upstream catalyst; and setup means, which sets the value for causing the downstream catalyst to fully occlude oxygen in accordance with the oxygen storage capacity of the upstream catalyst.

* * * * *